(12) United States Patent
Chopra

(10) Patent No.: US 8,407,635 B2
(45) Date of Patent: Mar. 26, 2013

(54) SYSTEM AND METHOD FOR AUTOMATIC EXTRACTION OF POWER INTENT FROM CUSTOM ANALOG/CUSTOM DIGITAL/MIXED SIGNAL SCHEMATIC DESIGNS

(75) Inventor: Amit Chopra, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 125 days.

(21) Appl. No.: 13/018,283

(22) Filed: Jan. 31, 2011

(65) Prior Publication Data

US 2012/0198408 A1 Aug. 2, 2012

(51) Int. Cl.
G06F 17/50 (2006.01)
(52) U.S. Cl. ........ 716/105; 716/107; 716/109; 716/111; 716/127; 716/133; 703/16
(58) Field of Classification Search .................. 716/105, 716/107, 109, 111, 127, 133; 713/16; 703/16
See application file for complete search history.

(56) References Cited

U.S. PATENT DOCUMENTS

| | | | | |
|---|---|---|---|---|
| 4,763,289 A * | 8/1988 | Barzilai et al. ...................... 703/2 |
| 4,811,237 A * | 3/1989 | Putatunda et al. ............ 716/127 |
| 6,493,859 B1 * | 12/2002 | Gould et al. .................. 716/127 |
| 6,631,502 B2 * | 10/2003 | Buffet et al. .................. 716/111 |
| 7,333,926 B2 * | 2/2008 | Schuppe ......................... 703/15 |
| 7,496,877 B2 * | 2/2009 | Huber et al. .................. 716/120 |
| 7,809,543 B2 * | 10/2010 | Chiu et al. ...................... 703/15 |
| 7,954,078 B1 * | 5/2011 | Wang et al. ................... 716/127 |
| 2003/0135830 A1 * | 7/2003 | Buffet et al. ....................... 716/4 |
| 2005/0120322 A1 * | 6/2005 | Chen et al. ...................... 716/13 |
| 2008/0168409 A1 * | 7/2008 | Chiu et al. ......................... 716/5 |
| 2009/0138836 A1 * | 5/2009 | Budell et al. ...................... 716/5 |
| 2011/0107283 A1 * | 5/2011 | Oh et al. ........................ 716/107 |
| 2011/0161899 A1 * | 6/2011 | Ginetti et al. ................. 716/106 |
| 2011/0161900 A1 * | 6/2011 | Ginetti et al. ................. 716/106 |
| 2011/0321000 A1 * | 12/2011 | Fujimori ....................... 716/136 |

OTHER PUBLICATIONS

"Property Specification Language: Reference Manual", Version 1.1 (online), Accellera Organization, Napa CA, Jun. 9, 2004. [retrieved on Nov. 7, 2011]. Retrieved from the Internet: < URL: http://www.eda.org/vfv/docs/PSL-v1.1.pdf>, 131 pgs.

Kumari, Ajeetha, "Property Specification Language Tutorial (Parts 1-3)" (online) Jul. 15, 2011 [retrieved on Nov. 7, 2011]. Retrieved from the Internet: <URL: http://www.project-veripage.com/psl_tutorial_1.php >, 13 pgs.

* cited by examiner

*Primary Examiner* — Phallaka Kik
(74) *Attorney, Agent, or Firm* — Schwegman Lundberg & Woessner, P.A.

(57) ABSTRACT

A method of producing a hierarchical power information structure for a circuit design, the method comprising traversing a circuit design hierarchy from a top design level to a bottom design level to identify any intermediate design levels, associating identified power nets with ground nets to produce one or more power domains, producing one or more power domains using the identified power nets and ground nets, identifying an instance of one or more special cells that are associated with a power related property and creating constructs for the special cells in the hierarchical power information structure, generating power rules for the intermediate level design using the special cell constructs, mapping higher design level power domains to lower design level power domains within the intermediate design level, and storing the power domains and power rules as power intent within an information structure associated with a schematic for the intermediate level design.

36 Claims, 20 Drawing Sheets

| ADD PIN | | | |
|---|---|---|---|
| PIN NAMES | P11 | | |
| DIRECTION | INPUT | BUS EXPANSION | ● OFF  ○ ON |
| USAGE | SCHEMATIC | PLACEMENT | ● SINGLE  ○ MULTIPLE |
| SIGNAL TYPE | SIGNAL | | |

ATTACH NET EXPRESSION:  ● NO  ○ YES

PROPERTY NAME [ ]
DEFAULT NET NAME [ ]
FONT HEIGHT [0.0625]   FONT STYLE [STICK]

ATTACH SUPPLY SENSITIVITY  ● BOTH   ○ POWER   ○ GROUND   ○ NONE
SENSITIVE TO POWER TERMINAL   [NONE ▼]
SENSITIVE TO GROUND TERMINAL  [NONE ▼]

(ROTATE) (SIDEWAYS) (UPSIDE DOWN) (HIDE SENSITIVITY)

(HIDE) (CANCEL) (DEFAULTS) (HELP)

705
IDENTIFY THOSE POWER AND GROUND NETS THAT ARE I)ASSOCIATED WITH A NET TERMINAL, II)A POWER NET OR GROUND NET THAT IS INHERITED, III)A POWER NET OR GROUND NET THAT IS GLOBAL AND IV)NOT CONNECTED TO A SWITCHABLE POWER PIN OF A SWITCH CELL INSTANCE, AND CREATING A POWER DOMAIN FOR AN IDENTIFIED NET.

710
ASSOCIATING POWER NETS WITH A GROUND NET.

715
ASSIGNING INSTANCES TO POWER DOMAINS.

720
ASSIGNING BOUNDARY PORTS TO THE POWER DOMAINS.

*Fig. 7*

| POWER DOMAIN (2) ▼ | ATTRIBUTES ▼ |
|---|---|
| ⊞ NAME | (VARIOUS) |
| ⚡ PD_1 | PD_1 |
| ⚡ PD_2 | PD_2 |
| ⊞ POWER NET | (VARIOUS) |
| ⚡ PD_1 | A |
| ⚡ PD_2 | V1 |
| ⊞ GROUND NET | GND! |
| ⊞ POWER VOLTAGE | 0 |
| ⊞ GROUND VOLTAGE | 0 |
| ⊞ DEFAULT | (VARIOUS) |
| ⚡ PD_1 | TRUE |
| ⚡ PD_2 | FALSE |
| ⊞ PORTS | ▷ |
| ⊞ INSTANCES | (VARIOUS) |
| ⚡ PD_1 | R3 R6 R2 R5 R4 R9 R1 R7 R0... |
| ⚡ PD_2 | V0 |
| ⊞ EQUIV POWER NETS | (VARIOUS) |
| ⚡ PD_1 | F B C D G E H |
| ⚡ PD_2 | V2 |
| ⊞ EQUIV GROUND NETS | GND |
| ⊞ BASE DOMAINS | |
| ⊞ SHUTOFF CONDITION | |
| ⊞ EXTERNAL SHUTOFF | |

*Fig. 18*

| ○ NOMINAL CONDITION ▼ | ATTRIBUTES ▼ |
|---|---|
| NAME | NC1 |
| STATE | OFF |
| VOLTAGE | 0 |
| GROUND VOLTAGE | 0 |
| PMOS BIAS VOLTAGE | 0 |
| NMOS BIAS VOLTAGE | 0 |

*Fig. 19*

CREATE POWER MODE

NAME [        ]

POWER DOMAINS
PD5
PD4
PD3
PD2
PD1

NOMINAL CONDITIONS
NC2
NC1

←—
—→

DOMAIN CONDITIONS

| POWER DOMAIN | NOMINAL CONDITION |
|---|---|
|  |  |

☐ SET AS DEFAULT MODE ( OK )  ( CANCEL )  ( HELP )

*Fig. 20*

SYSTEM AND METHOD FOR AUTOMATIC EXTRACTION OF POWER INTENT FROM CUSTOM ANALOG/CUSTOM DIGITAL/MIXED SIGNAL SCHEMATIC DESIGNS

BACKGROUND

Integrated circuit (IC) designs are sometimes referred to as intellectual property (IP) cores, or IP blocks or IPs. IPs are reusable designs that are sold or licensed by the designing party. Custom Analog, Custom Digital, and Mixed Signal IPs are typically schematic based and are usually hierarchical in organization. Hierarchical IP designs can also be based in a hardware description language (HDL) (e.g., Verilog, VHDL), or other text netlist (e.g., EDIF, SPICE, ITT/DEF, etc.). A top level or higher design level includes instances of various sub-blocks connected to each other. The hierarchical IPs include one or more sub-levels eventually leading to a leaf block that is included in a bottom most level. The sub-blocks and the leaf blocks can be composed of primitive components of a standard cell library or reference library, such as logic gates and transistors.

An important consideration in IC design is conserving power in the manufactured IC. A complex IP may use more than one supply voltage and may use more than one technique for power optimization. The sub-blocks and leaf blocks may use explicit power and ground pins that can be driven at a top level or can use connections inherited from other design levels (e.g., override-able connections).

A power intent specification for an electronic circuit design is typically in text form and the format of a power intent specification can be any well recognized power intent specification stand, such as the Common Power Format (CPP) and the Unified Power Format (UPF, e.g., both the Accellera UPF 0.0 and IEEE 1801 aka UPF2.0) standards for example.

A power intent specification for physically implemented IP designs allows programmable power connectivity (e.g., for reuse of the IP with different power supplies) and allows power experimentation with the IP, such as for low power management, low power simulation, IP integration, and form design verification for example. To enable integration of the IP into new designs, a power intent specification is needed so that the IN power connectivity can be checked in the context of the IPs instantiation into the designs.

Text editors are typically used in creating power intent specifications. The use of text editors in the creation of power intent specifications for an existing IP can be a tedious, time consuming and error pone task for a design engineer. The power intent is usually determined by a designer reverse-engineering the design by tracing the power connections and determining which of the sub-structures of the connected devices are controllers of the flow and consumption of power. As designs increase in size and complexity, so do the power intent specifications of the designs, and the probability of introducing errors into the power intent specification increases.

Further, in text-based editing, the user must manually keep track of the design object names that will be referenced in the power intent specification and enter all the power intent details correctly. The user also needs to keep track of edits made to the circuit design and manually update a previously created power intent specification to synchronize with the updated design. In addition, the text editor used to create the specification may not be able to provide feedback whether all the required design details are entered. If the resulting specification is syntactically as well as semantically clean but nevertheless contains design errors, special equivalence checking tools must be used to catch such errors. This equivalence checking adds cost and time to the design process.

The use of form-based applications to create power intent specifications for existing IP designs can provide some prompting to assist in entering all the correct details, but using these applications is still cumbersome for large designs and the likelihood of errors is still high. Most of the limitations associated with text editing arising out of a lack of direct coupling between the design editor and the power intent editor are also exist with respect to form based applications. For example, as in the text editor approach, the user must manually keep track of the design object names that will be referenced in the power intent specification and enter all the power intent details correctly. The user also needs to keep track of edits done to the design and manually update a previously created power intent specification to bring it in agreement with the design. The inventor has recognized a need for improved tools to help a design engineer create power intent specifications.

OVERVIEW

This document relates generally to design automation tools, and in particular to automatic extraction of power intent from custom integrated circuit (IC) designs. An example of a method of producing a hierarchical power information structure for a circuit design includes traversing a circuit design hierarchy from a top design level to a bottom design level to identify any intermediate design levels, associating identified power nets with ground nets to produce one or more power domains, producing one or more power domains using the identified power nets and ground nets, identifying an instance of one or more special cells that are associated with a power related property and creating constructs for the special cells in the hierarchical power information structure, generating power rules for the intermediate level design using the special cell constructs, mapping higher design level power domains to lower design level power domains within the intermediate design level, and storing the power domains and power rules as power intent within an information structure associated with a schematic for the intermediate level design.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 shows another example of a UI for Pin Creation that includes fields for specifying pin properties at the time of pin creation.

FIG. 7 shows a flow diagram of an example of a method of producing non switchable power domains.

FIG. 10 shows an example of an Export Power Intent Form for a

FIG. 18 shows an example of extracted power domains for the short device example of FIG. 12

FIG. 19 shows a Nominal Condition form for a UI.

FIG. 20 shows a Create Power Mode form for a UI.

FIG. 21 shows an example of an Import Power Intent form for a

DETAILED DESCRIPTION

Figure 1:
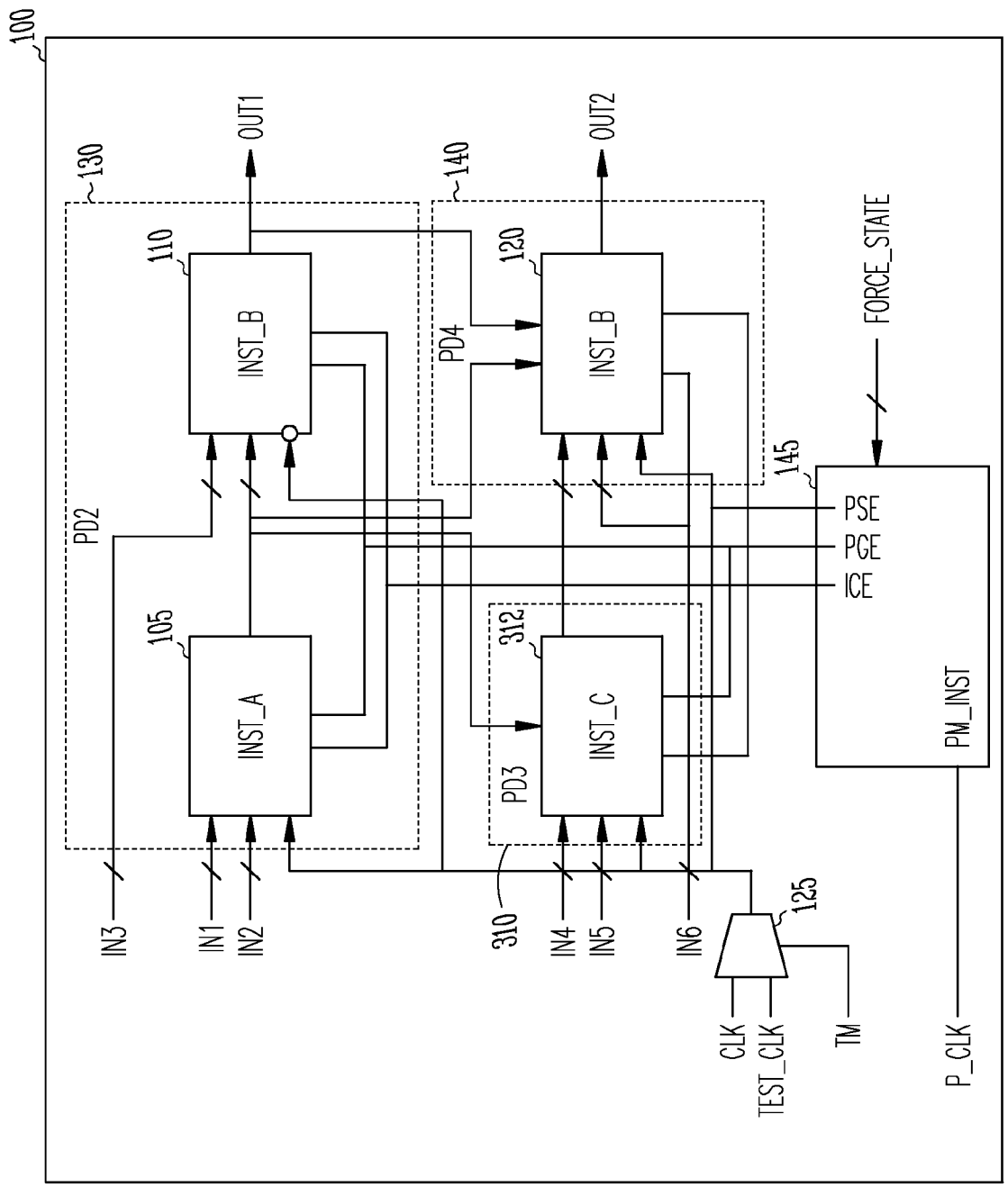
FIG. 1 shows a block diagram of portions of an example of a simple hierarchical circuit design.

IC design is typically performed using electronic design automation (EDA) tools or electronic computer aided design (ECAD) tools. To design a custom IC, a designer typically creates a description of the circuit using a schematic editor. Instances of design components (e.g., devices or cells) are instantiated into a schematic using the schematic editor. The instances are interconnected within the schematic or between schematics. The resulting designs can be purely digital circuit designs, purely analog circuit designs, or a mix of digital and analog circuit designs.

The schematic designs created are logical abstractions of the design and are often hierarchical in arrangement. Higher level designs are created using functional blocks defined at lower design levels with the bottom most level containing fundamental design building blocks, such as logic gates, transistors, resistors, etc. This can be viewed as a bottom-up approach to design. Sometimes, designs are created following a top down methodology, and a designer may create the design using a high-level design language (RDL). Synthesis can then be used to create tower levels of the design hierarchy.

For larger circuits or systems, the designs created are often modular in nature. Designs are broken up into smaller parts typically according to function. Individual designers or design teams can work on the individual designs which can be incorporated into the overall design by interconnecting the individual design modules at a higher level of the circuit design hierarchy. A netlist can then be created to define the parts in the design and define how the parts are intercon-nected. The resulting file can be used for simulation and implementation of the design. The designs created can be used for a specific product design or can be sold or licensed and used in multiple product designs as IP cores.

The power intent specifications can be created or defined during the behavioral design specification phase; before the physical implementation phase where such a power specification can be used to guide the behavioral synthesis tools in the creation of power and ground nets and insertion of special low power cells like power-switch cells, isolation cells, level-shifter cells as per the power specification. The behavioral synthesis tool may also transform its input power intent specification and produce an equivalent power intent specification in which the references and annotations to design object is in sync with the synthesized design.

The power specification can also be created or defined at the physical implementation phase of a custom design after the behavioral aspects of the design have been entered and verified. The methods described herein relate to the creation or definition of the power intent specification during the physical implementation phase. Special power management design techniques (e.g., providing an area of the IC where power can be removed) have ordinarily been implemented at this implementation phase, but the intended power management behavior has not been captured at the schematic design phase.

Typically, the power intent specification is captured in a file separate from the schematic design process. As explained above, use of text editors and form-based applications to create power intent specifications can lead to entering errors into the power specification. Adding power intent to the schematic design phase may improve the likelihood that power intent of the design is captured accurately. Power intent can then be extracted from the circuit design and exported to a user or a process executing on a computer. This allows power intent to be incorporated into the EDA flow to verify the IC design.

FIG. 1 shows a block diagram of portions of an example of a simple hierarchical circuit design. The design may be an IP block or part of an IP block. The example shown includes a top design level 100 that includes four instances of functional cells; inst_A, 105, inst_B 110, inst_C 115, and inst_D 120. The four instances may each represent one or more intermediate levels of the design hierarchy. An instance may be selected and opened with a schematic editor running on a computing device, such as an EDA workstation. The selected instance may include further instances of cells representing intermediate level designs that may also be selected and opened. Eventually, a bottom level design or leaf block of the design is reached that includes instances of primitive components such as logic gates, transistors, resistors, capacitors, etc. The top level design 100 may also be represented by an instance.

In the example, each instance includes a set of input and output signals. The example also shows a clock gating logic circuit 125 that receives input signals elk and test_clk, and a control signal TM (test mode). The output of the clock gating logic circuit 125 controls the gating of the clocks to instances inst_A 105, inst_B 110, inst_C 115, and inst_D 120.

The example design also illustrates a simple example of including power intent in a schematic design. Four power domains (PD1, PD2, PD3, and PD4) are shown. A power domain is a part of the circuit design that operates at a specific operating voltage. Individual power domains at the implementation level typically include at least one power net and at least one ground net and include one or more cell instances connected to the nets. A "net" can refer to a signal or a collection of signals in the schematic design. Nets include power nets and ground nets (sometimes called supply nets) and are associated with a current or voltage. Hence, a power net provides or receives the electrical power signals assigned to that power net to and from the instances in the power domain that are connected to the power net. Similarly, a ground net provides or receives the electrical ground signals assigned to that ground net to and from the instances connected to the ground net. A power domain may encompass one or more instances, and may be created to provide the necessary power and ground to the function performed by the instance. (It is possible for a power domain to not be associated with a power or ground supply, but such a power domain may just act as a placeholder to indicate that instances and ports associated with the power domain belong to a group that is eventually going to receive a common power supply) in the example, the top level design 100 and the clock gating logic circuit 125 belong to PD1. PD1 can be designated as a default power domain. A default power domain can be a power domain to which all instances will be connected unless another power domain is defined. Instances inst_A 105 and inst_B 110 belong to PD2 130. Instance inst_C belongs to PD3 135 and inst_D belongs to PD4 140. The example also shows a power manager instance pm_inst 145 that belongs to the default power domain PD1. The power manager instance generates three sets of power controls, namely pse_enable, pge_enable, and ice_enable to control the power domains.

Figure 2:
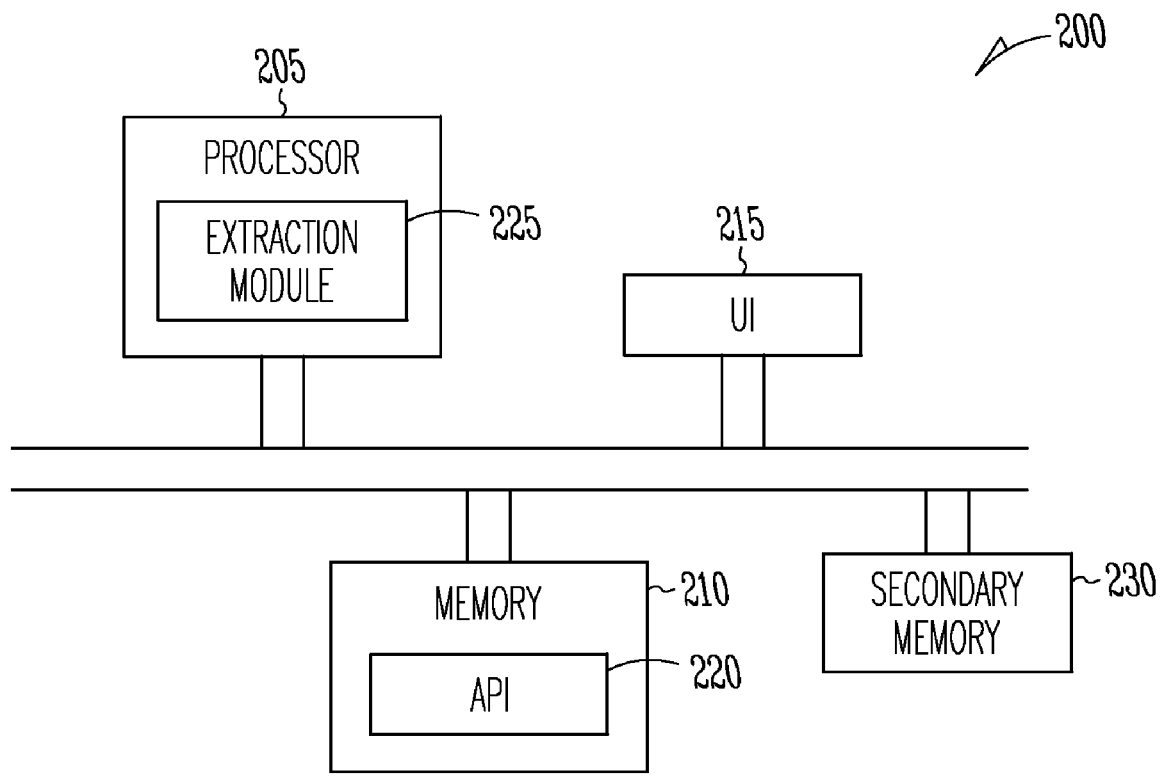
FIG. 2 shows a block diagram of portions of an example of a computing device 200.

A hierarchical circuit design, including the power intent, can be created using a computing device such as an EDA workstation executing a schematic entry application. FIG. 2 shows a block diagram of portions of an example of a computing device 200. The computing device 200 includes a processor 205 (e.g., a microprocessor) executing instructions to implement a schematic editor for a circuit design. The computing device 200 also includes a memory 210 integral to or communicatively coupled to the processor 205. The instructions can be included in the memory 210 or in another machine readable medium.

The computing device 200 also includes a user interface 215 (UI), such as a graphical user interface (GUI), to receive schematic designs and edits to designs from a user. The UI may include one or more of a display, a keyboard, and a computer mouse. The computing device 200 can also include one or more application programming interfaces 220 (API) to perform functions related to creating the power intent, functions related to exporting a hierarchical power information structure e.g., a power intent specification) of the circuit design, and functions related to setup for the creation of the power intent specification. APIs can reside in the memory 210 or the processor 205. In certain examples, a hierarchical power information structure can be exported at any point in the development of the circuit design.

In some examples, the computing device 200 includes a secondary memory 230 (e.g., hard disk, etc.). The set instructions that the processor is about to execute (instruction window) can be first pre-fetched for execution into the memory 210 from secondary memory, which can be the persistent location of the instructions. This is known as instruction pre-fetching and it avoids having the user enter instructions from a UI or API and also allows memory swapping—making room in 210 by clearing some of the instructions that are not in use currently and are also available on secondary memory persistently. The persistent storage means that the structure created is available after the process that created it is no longer available. The secondary memory may also persistently store outputs of running processes to on-disk storage units called files, which can be accessed by specifying their name and location. The extracted power intent can be persistently stored in secondary storage or can be exported to an on-disk file with a given name and at a specified location.

Figure 3:
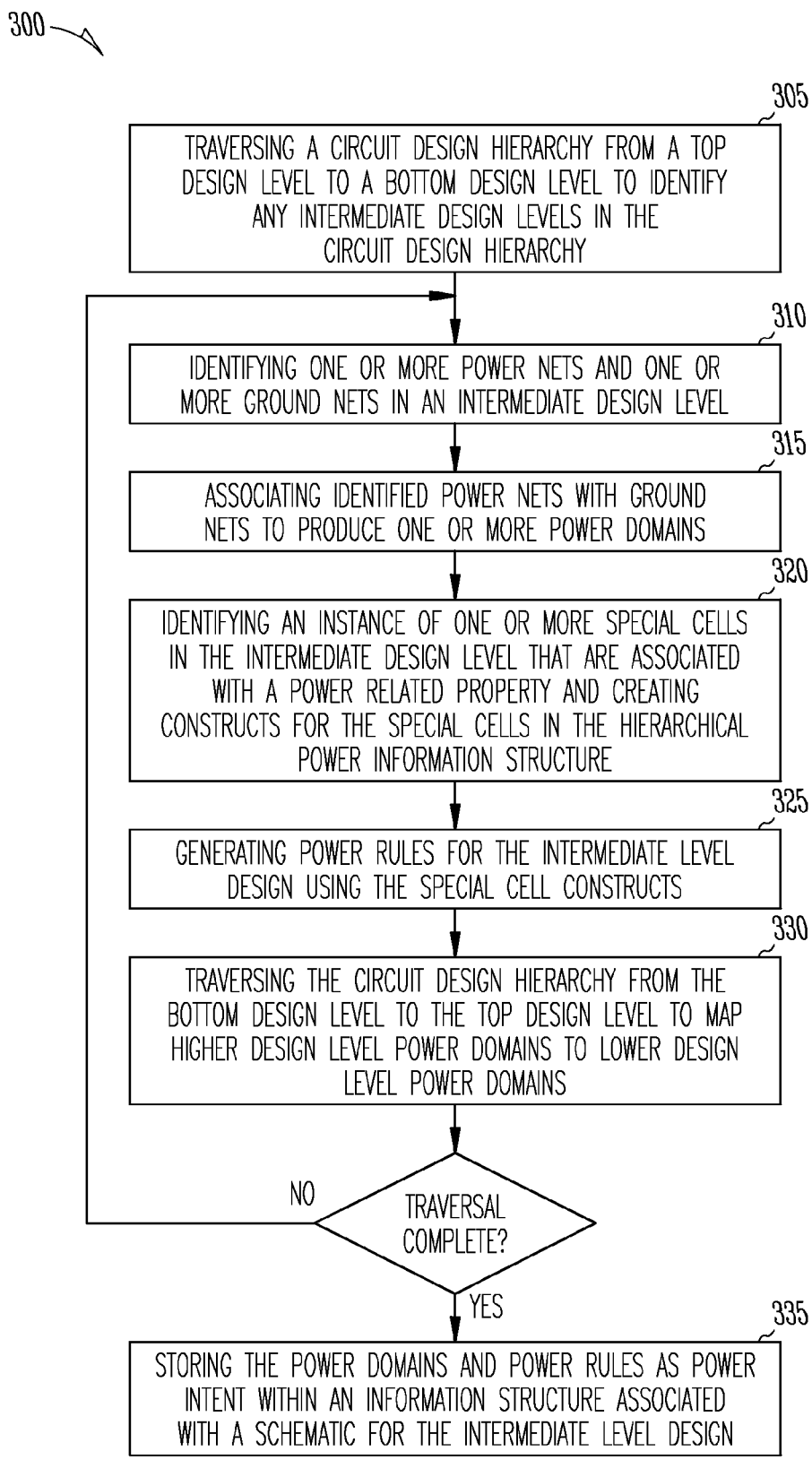
FIG. 3 is a flow diagram of a method to produce a hierarchical power information structure for a circuit design.

FIG. 3 is a flow diagram of a method 300 to produce a hierarchical power information structure for a circuit design. The circuit design can include multiple instances e.g., cells, design models, macros, etc.) encoded and arranged hierarchically in computer readable memory (e.g., memory 210 in FIG. 2) or other computer readable medium. The hierarchical power information structure includes power intent extracted from the circuit design, which can be produced for intermediate levels of the circuit design as well as for the top design level. In certain examples, any arbitrary design level can be selected for export by a user. The design level chosen to produce the power information structure contains nets and interconnected components but my be devoid of any behavioral content. If behavioral content is present it is typically ignored.

The process of producing power intent is different from generating a netlist for the circuit design. Netlist generation typically involves producing a simulator specific dump of design connectivity information that is explicitly present in the design and has been entered into the design with a schematic editor. All information that is printed in the netlist is essentially explicitly there in the design (e.g., there could be a switch cell present in the design as well as in the netlist, there could be a power net in the design that is available as supply1 (or 1'b1) in the netlist, there could be a ground net in design that is available as supply0 (or 1'b0) in the netlist, there could be properties or parameters in the design/components that are available in the netlist, etc.).

Automatic extraction of power intent involves the extracting of power information that is not explicitly in the circuit design. The power information is inferred using what is explicitly present in the design and user-defined rules that can be entered during a setup process for the automatic extraction. For example, there could be a power net and a ground net in the design, but the extracted power intent could have power domains that make use of pairing of the power and ground nets in the design. Similarly, the design could have a switch cell explicitly instantiated, but an extracted power intent could also be comprised of a primary power domain, a switchable power domain and power switch rule.

In some examples, the method 300 is performed by the computing device 200 of FIG. 2. The processor 205 may include an extraction module 225 to perform the method 300. The module performs the functions described. The modules can include software, hardware, firmware or any combination thereof. The functions can be performed by more than module and the extraction module is merely an example.

In certain examples, the method 300 is implemented as part of a schematic editor that executes on an EDA workstation. In some examples, the method is embodied in instructions included in a computer-readable medium. The instructions, when performed by the computing device 200, cause the computing device 200 to generate the hierarchical power information structure.

At block 305, the circuit design hierarchy is traversed from a top design level to a bottom design level to identify any intermediate design levels in the circuit design hierarchy. For instance, the circuit design can be a hierarchical circuit design information structure or file stored in the memory and intermediate deign levels can be recognized according to a label for any design levels in the circuit design information structure.

At block 310, when an intermediate design level is encountered, one or more power nets and one or more ground nets are identified in the intermediate design level. The power nets and ground nets can be designated by the user. In some examples, a user designates signal nets and power nets or ground nets as the user performs schematic entry of a circuit design via the UI 215 of FIG. 2. This can also be performed as part of the setup for producing power intent from the circuit design.

Figure 4:
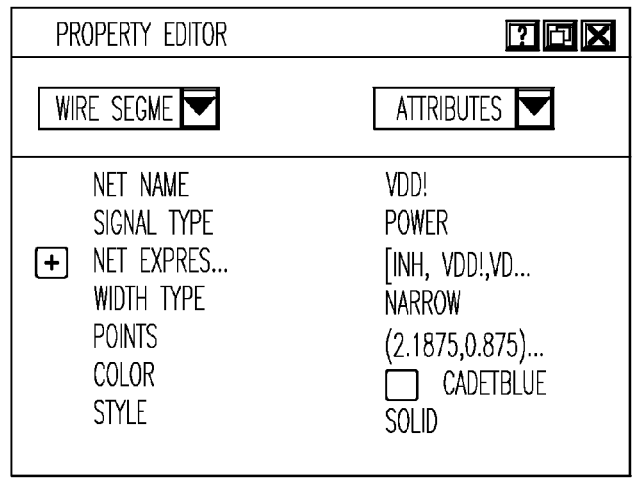
FIG. 4 shows an example of a Property Editor form for a user interface (UI).

FIG. 4 shows an example of a Property Editor form for a UI to update properties of nets entered into a circuit design. The user selects a pin or net and opens a property editor application to designate the type of net. In certain examples, the default property of a net is "signal" net. The user can designate the selected pin as a "power" net or a "ground" net.

Figure 5:
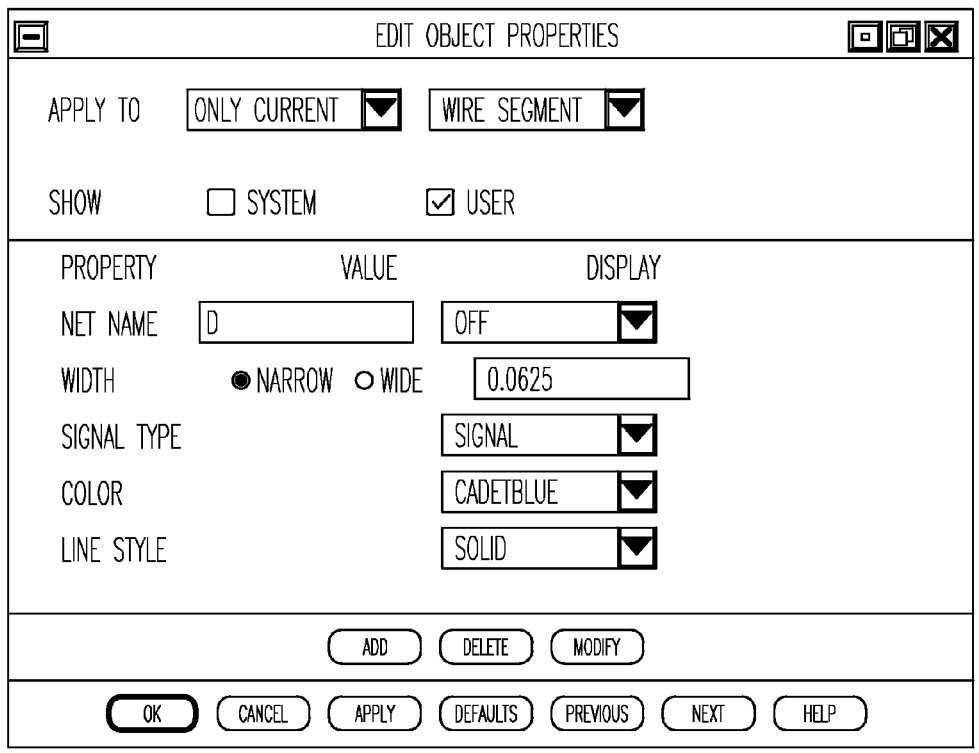
FIG. 5 shows an example of a UI screen display including an edit properties display.

FIG. 5 shows an example of a UI screen display including an edit properties display. A user can designate a net type by selecting the net and updating the signal property in the UI screen display. The signal property is shown as the default value "signal," A user updates the property by setting the value of the field to "power" or "ground."

FIG. 6 shows another example of a UI for Pin Creation that includes fields for specifying pin properties at the time of pin creation. In this example, the user specifies the appropriate signal type (e.g., power or ground) white creating a new pin using an Add Pin Command. Again, the signal property is shown as the default value "signal." A user specifies the property by setting the value of the field to "power" or "ground."

According to some examples, identification of a set of one or more net names to be treated as power net names is received via at least one of a UI or an API, and identification of a set of one or more net names to be treated as ground net names is received via the at least one of the UI and the API.

In some examples, the user can set a rule to register or categorize certain net names in the circuit design as power nets or ground nets using an API. For instance, a user can register names of power nets in the circuit design by entering the following SKILL language statements making use of the 'cpfRegisterNet' API:

```
names = '("avdd" "avdd!" "vdd" "vdd!" "vdda" "vdda!" "AVDD"
"AVDD!" "VDD" "VDD!" "VDDA" "VDDA!")
cpfRegisterNet("power" names ?regexNetNames list ("VDD*")) .
```

Similarly, a user can register names of ground nets in the circuit design by entering the following:

```
names = list'("vss" "vss!" "vssa!" "VSS!" "VSS" "VSSA" "gnd" "gnd!"
"gnda" "gnda!" "GND" "GND!" "GNDA" "GNDA!")
cpfRegisterNet("ground" names ?regexNetNames list("GND*" "VSS*")) .
```

Returning to FIG. 3, at block 315, the identified power nets and ground nets are associated to produce one or more power domains. FIG. 7 shows a flow diagram of an example of a method 700 of producing power domains. At block 705, those power and ground nets that are at least one of i) a power net or ground net associated with a net terminal, ii) a power net or ground net that is inherited, iii) a power net or ground net that is global, and iv) unconnected to a switchable power pin or switchable ground pin of a switch cell instance, are identified in the intermediate level design and a power domain is created for the identified net. A switchable power pin and a switch cell instance are explained later in this document.

A global power net or global ground net can be a net that is identifiable throughout the circuit design. If a global power net is defined as vdd!, a power domain is created for this net. In certain examples, a power domain is created for all global power nets in levels of the design below the intermediate design level with which the user is working. For instance, if a global net VDU is defined and present in instance INST_A 105 of FIG. 1, then power domains are created in schematics for the top both level 100 and in schematics for INST_A 105. In addition, the power domain inside INST_A 105 is mapped to the power domain PD2 in the top level 100.

A power domain is also created for a power net or ground net if the net includes a terminal. A power domain is further created for a net that is inherited. An inherited net is a net in a design level that is override-able from any higher level design containing the net. The inherited net or parents of the net are instantiated in the higher level design.

In some examples, a default prefix is automatically added to the names of power domains produced to identify the power domains in the power information produced. In certain examples, a prefix for a power domain can be registered or specified using an API. For instance, cpfRegisterPowerDomainNamePrefix("PwrDo-
main_")

can be used to set "PwrDomain_" as the prefix. As a result, automatically created power domains will be prefixed with "PwrDomain_."

At block 710, power nets of power domains are associated with a ground net. A base power domain can be generated for each identified power net, and a specific ground net associated with the specific identified power net is assigned to the base power domain. If there is only one ground net at the design level of interest that has a terminal, is inherited, or is global, the same ground net may be automatically associated with all the power domains. If there are multiple ground nets, associating power nets and ground nets may include specifying power net and ground net pairs via an API. For instance, power net and ground net pairs may be registered by

```
cpfRegPowerGroundNetPairs( '( ("VDD" "GND") ("VDDA" VSSA")
("PWR" "GND") ) ) .
```

When producing the power information structure, a specified ground net can be associated to a power net using the registered power and ground net names when producing or extracting power domains from the circuit design. For example, if a power net is identified with name VDD and a ground net is identified with the name GND, a base power domain (e.g., PD1) is generated with power nets and ground nets as VDD and GND, respectively. Some of the generated base power domains may be assimilated at later stages of producing the power intent information structure. Prefixes can be automatically added to the base power domains.

In some examples, a default power domain can be identified. In certain examples, identification of a power net and a ground net of a delimit power domain can be received via one or both of the UI and the API. When the circuit design is traversed to produce the power intent information structure, any power net and ground net with names that match those of the default power domain are assigned or attached to the default power domain. In certain examples, a power net name and a ground net name can be registered for a default power domain. If more than one pair is registered for the default, the first power domain encountered matching one the pairs in the default list is used as a default power domain. A list of default pairs of net names can be registered using an API. For instance, cpfRegDefaultPowerDomainPGNets('(("7V!" "0V!")
        ("DC!" "SC!")))

registers default pairs 7V!/0V! and DC!/SC!. When traversing the circuit design to generate power domains, a search for a default domain starts from the beginning of the registered list and looks for a power domain that has a power net name of 7V! and a ground net name of 0V!. If the pair is found, a power domain with this pair of power/ground net names is set as the default power domain. Otherwise, the second pair, is searched for. Similarly, the entire list of power net and ground net pairs is searched until matching pair is found and the default power domain is assigned accordingly.

At block 715, instances are assigned to power domains. Instances (e.g., cell instances) of circuit design are associated with a specified name and path in the design and have a specified power net and ground net. An instance can be automatically assigned to a power domain having a matching power net and ground net. For example, if power domain PD2 of FIG. 1 includes power net VDDA and ground net VSSA, and Inst_A and Inst_B are connected to VDDA and VSSA, the Inst_A and Inst_B are assigned to PD2. The instance assigned can be one or more of a leaf cell instance, a sub-design cell instance, and a cell instance of an intermediate level design.

In some examples, a power net and ground net pair can be specified for an individual instance, device, or design model of the circuit design as part of a setup process for producing the power information structure. In certain examples, an API assigns at least one of an instance of a cell or an instance of a design model having a specified power net and ground net to a power domain having a matching power net and ground net. An instance can be assigned to a specific power domain by registering the instance to a power net and ground net of a specific power domain using the API. For example, cpfRegInstancePowerGroundNetPair("Inst_A"
        "VDD" "GND")

registers the instance labeled Inst_A to the power domain having the power net named VDD and having the ground net named "GND."

In some examples, all the instances of a given design cell type or device type in a circuit design can be added to a specific power domain. In certain examples, an API assigns instances of at least one of a cell type or a design model type that has a specified power net and a specified ground net to a power domain having a matching power net and ground net. An instance can be assigned by registering the device to a power net and ground net of a specific power domain using the API. For example, if the device is identified as device (lib, cell, view), cpfRegDevicePowerGroundNetPair("ether_digital" "top_1_port_pnr"
    "symbol_golden" "VDD" "GND")

registers the symbol view "symbol golden" of cell "ether_digital:top_port_pnr" to the power domain having the power net named VDD and having the ground net named "GND,"

All the instances of a given design cell or device having a given model parameter-value pair can be added to a specific power domain by registering that cell to a power net and ground net of a specific power domain using an API. For example, if cell "ether_digital"top_1_port_pnr" with symbol view "symbol golden" has a model parameter "model name", cpfRegModelPowerGroundNetPair("ether_digital" "top_1_port_pnr"
    "symbol_golden" "modelName" "top_1_port" "VDD" "GND")

registers all instances of lib/cell "ether_digital/top_1 port_pnr" for which the model parameter has value "top_1_port" to the power domain having the power net named VDD and having the ground net named "GND,"

At block 720, boundary ports are assigned to the power domains. In some examples, the boundary ports for a power domain are determined by identifying the design terminals that are sensitive to the terminal corresponding to the (primary power net or ground net. Terminal supply and/or ground sensitivity can be a database attribute of a terminal. In some other examples, the boundary ports are determined by input and output terminals connected to the instances of the power domains.

Returning to FIG. 3, at block 320 any instances of "special" low power cells in the intermediate design level are identified. When a special cell is identified, a definition or construct for the special cell is created in the hierarchical power information structure. A construct is an information structure that includes properties and attributes of a special cell. A unique construct for an individual special cell will includes values required for the parameters and/or attributes. These special low power cell instances can include among other things, a level shifter cell instance, an isolation cell instance, a switch cell instance, and an always on cell instance. The special cells are added to the design during the schematic entry process to implement low power functions, and these low power functions can be added to the power intent.

An example of a special cell is an Isolation Cell. To prevent the propagation of unknown states from the power domains that are powered down propagate to the domains that remain powered on, isolation cells are needed at the boundaries of the power domains that are powered down. Isolations cell instances are added to the design according to an isolation rule which defines the conditions when isolation is needed between domains or between pins and the type of isolation needed.

Another example of a special cell is a power switch cell that connects or disconnects the power supply to a design component according to an enable. The power switch cells are added according to a power switch rule that defines the location and type of power switches to be added and the condition for when to enable the power switch.

Another example of a special cell is a state retention cell which can be used for some sequential cells to keep their previous state prior to power down so as to facilitate the powered down blocks to resume normal operation, state retention cells. The state retentions cell instances are added to the design according the state retention rule.

Another example of a special cell is an always-on cell whose power supply has to be continuous 'ON' even when the power supply for the rest of the logic in the power domain is off. These cells are used to drive the control signals of the state retention cells in a domain that is being powered down or they are used in combination with isolation cells that are inserted in the power domain that is switched off to ensure that the driver of the enable pin of the isolation cells is never switched off.

Another example of a special cell is a power clamp cell that clamps a signal to a particular voltage.

Some of the special cells such as power switch cells or state retention cells or isolations cells are added according to some specific low power rule whereas some like the always on cells or power clamp cells are added because of their requirements for successful operation other low power cells.

Special cells can be added to the design to implement low power rules, and the low power rules can be produced as the special cells are identified during the power intent extraction process. Identification of instances of special cells is facilitated during a setup process in anticipation of producing power intent information from an existing schematic design. Special definitions or constructs are formed by querying the attributes of the special cell.

An example of a special cell associated with power rules is a power switch cell used to identify an internal switchable power net. An internal switchable power net includes an internal or secondary net connected to a power switch cell instance that connects a primary power net to the internal net according to an enable, and does not include an inherited net, or a global net. The internal net may be associated with an output or it may be connected through a network of short devices to another net with an output terminal.

At block 325, power rules are generated for the intermediate level design with which the user is working. For example, a base power domain may be produced using an identified primary power net. The power rules can be generated using constructs of the special cells.

Figure 8:
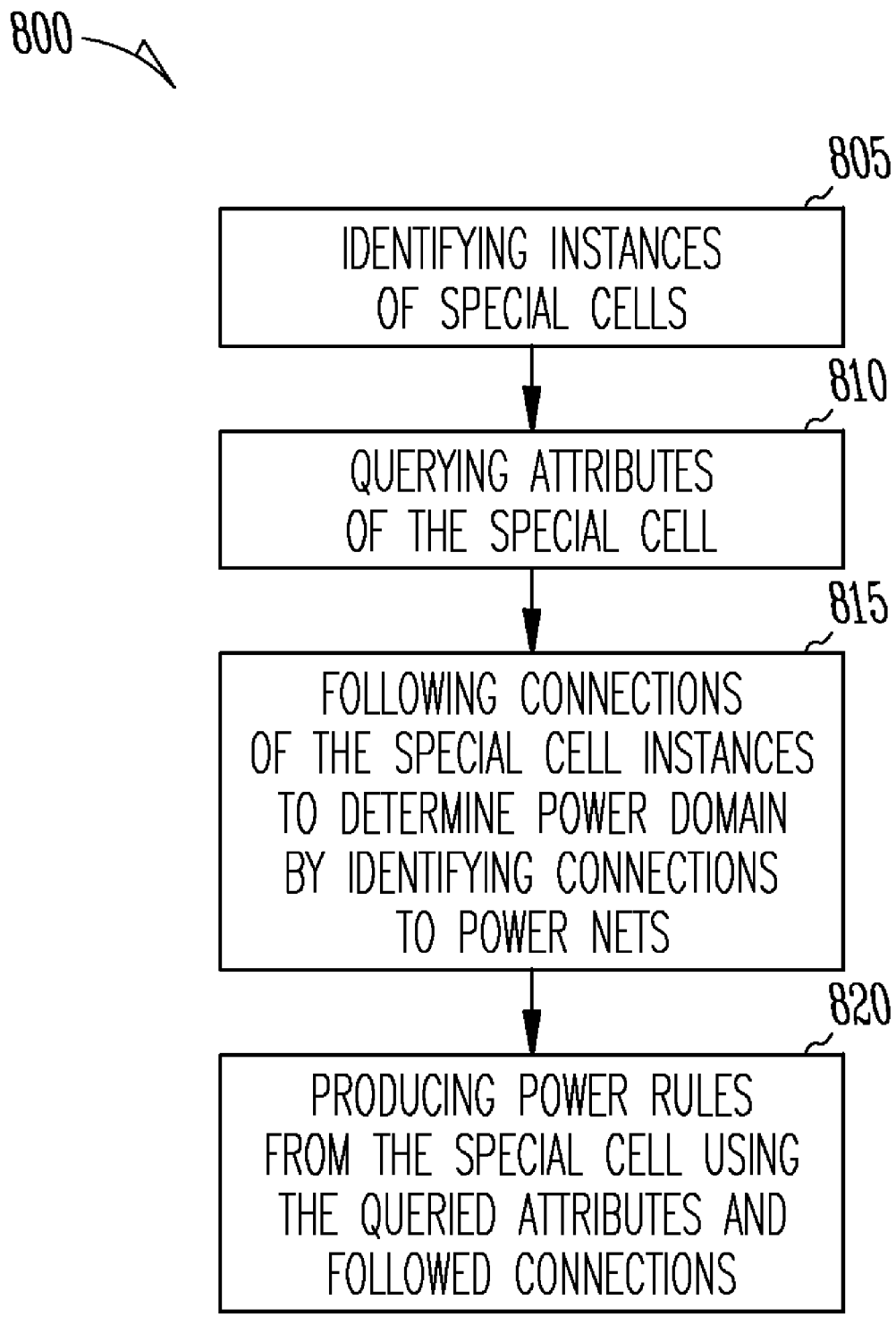
FIG. 8 shows a flow diagram of an example of a method of generating power rules.

FIG. 8 shows a flow diagram of an example of a method 800 of generating power rules. At block 805, any instances of special cells are identified in a top design level or an intermediate design level with which the user is working. At block 810, attributes of the cell instance are queried. At block 815, the connections of the instance are followed to determine power domains by identifying connections of the instance to power nets. At block 820, power rules are extracted from the cell instance using the attributes and connections. In some examples, the method is performed using an API, and an API can be used to register a prefix for rule created by special cells.

Using the example of a power switch cell as a special cell, the power rule generated may identify a base power domain for a primary power net connectable to an internal switchable power net identified by a power switch cell. The power rule may also include a shutoff condition for the internal switchable power net. The shutoff condition can include a logical expression to connect or disconnect a primary power net to the internal net. The logical expression can be derived from one or both of a signal in the circuit design and a net terminal in the circuit design. Other special cells, in addition to the power switch cell, that include properties or attributes used to generate power rules are described elsewhere in this document.

At block 330, higher level power domains are identified that map to (e.g., are the same as) identified tower level power domains. In some examples, this occurs when a bottom level is detected by encountering a leaf instance in the design and the traversal process returns back to the top level with which the user is working. Higher level power domains are mapped to tower level power domains by identifying power and ground nets. Power domains are deemed to be the same by virtue of sharing the same power/ground nets that span a multitude of levels of the hierarchy either explicitly or implicitly.

In certain examples, the power domain is propagated to a higher design level when the power domain has a global net as a primary power net. In certain examples, a power domain from a lower design level is mapped to a higher design level when the power domain has an inherited power net as a primary power net and the lower level instance has a special property called a netSet property whose value is same as a net in the higher level that is supposed to be override the inherited net at the lower level (implicit mapping). In certain examples, a power domain from a lower design level is mapped to a higher design level when the power domain has a primary power net connected to a terminal and the higher design level resolves a connection to the primary power net at the lower level by explicitly connecting it to a power net at the higher level (explicit mapping).

In some other examples, the switchable power domain from a lower design level is propagated to a higher design level as a switchable power domain when i) the power net of the power domain has a terminal whose direction is output and is available at the higher level where the net is driving instances of the higher level, ii) the power net(s) of the base domains of the switched domains are associated with a terminal having input or in-out direction and are available at the higher level as power nets that connect to the terminals associated with the power nets of base power domains at lower level, and iii) enable pins comprising the shutoff condition of the switch power domains are also associated with a terminal having input or in-out direction and are available at the higher level as power nets that connect to the terminals comprising the shutoff condition of the switchable power domains at lower level.

When the traversing to the top design level is complete, power domains may be generated at the top design level for any unresolved power nets in the circuit design hierarchy inherited from a tower design level. In addition, any unresolved lower level power domains are mapped to the top level power domain.

These power domains and power rules are part of the power intent for the intermediate design level. The power intent is included in the produced power information structure, and can include, among other things, the power domains, any switchable power domains, and instances included in the power domains. In certain examples, power intent is stored within an information structure associated with a schematic for the intermediate level design.

At block 335, when the hierarchy is traversed from the intermediate level design with which the user is working to the bottom level and back to the intermediate level design, the power intent produced can be exported. The power intent can be in an industry standard format such as the Common Power Format (CPF) or the Unified Power Format (UPF, both Accellera UPF1.0 and IEEE 1801 aka UPF2.0).

Figure 9:
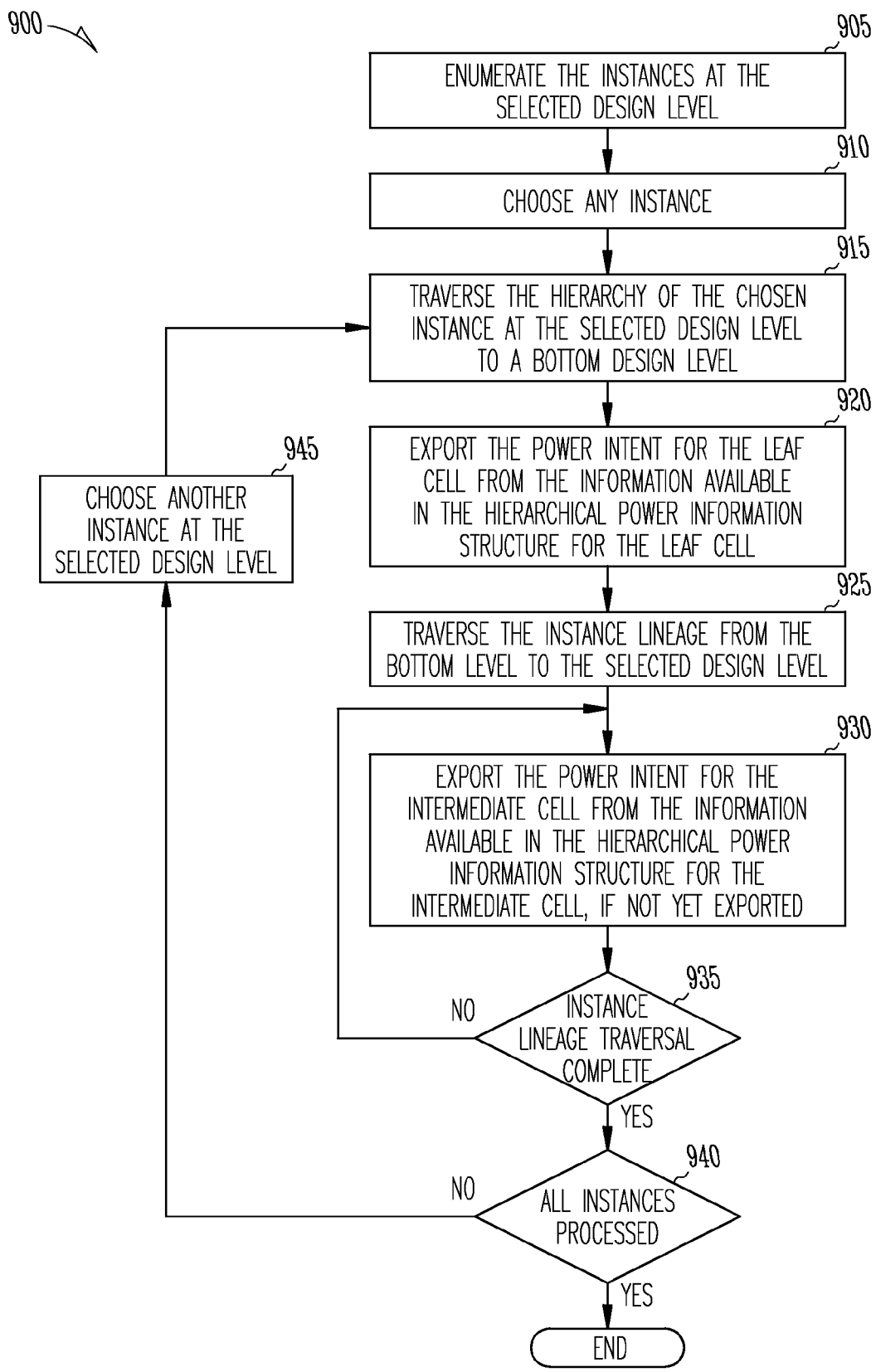
FIG. 9 shows a flow chart of an example of a method of traversing a selected design and exporting power intent during the traversal.

FIG. 9 shows a flow diagram of a method 900 of exporting power intent. At block 905, instances at the design level selected by a user are enumerated or otherwise identified. Any level from the top design level to the bottom design level can be chosen.

At block 910, any instance is chosen in the selected design level. At block 915, the hierarchy of the chosen instance is traversed down to a bottom design level. At block 920, the power intent for a leaf cell encountered at the bottom level is exported from the information available in the hierarchical power information structure for the leaf cell.

At block 925, the instance lineage is traversed from the bottom level back to the selected design level. At block 930, power intent for intermediate selected design level is exported using the information available in the hierarchical power information structure for the intermediate cell if it has not already been exported. At block 935, it is determined whether traversal of the instance lineage is complete. If not, more power intent is exported from the intermediate level at block 930.

If the traversal of the instance lineage is complete, it is determined at block 940 whether all instances in the selected design level have been processed, if not, another instance at the selected design level is chosen at block 945 and the method returns to block 915. If all instances have been processed, the export is complete.

An example of a portion of an extracted CPF file is shown below.

```
set_cpf_version 1.1
set_hierarchy_separator /
set_design BUFX2
   create_power_nets -nets VDD!
   create_ground_nets -nets VSS!
   create_power_domain -name pd1 -default -instances { mp1 mp0 }
   update_power_domain -name pd1 -primary_power_net VDD! -primary_ground_net VSS!
end_design
set_design TESTCPF_SUB2
   create_power_nets -nets DA!
   create_ground_nets -nets SA!
   create_power_domain -name pd1 -default
   update_power_domain -name pd1 -primary_power_net DA! -primary_ground_net SA!
   set_instance I_1 -design BUFX2 -domain_mapping { {pd1 pd1} }
end_design
set_design TESTCPF_TOP
   create_power_nets -nets DC!
   create_ground_nets -nets SC!
   create_power_nets -nets DA!
   create_ground_nets -nets SA!
   create_power_nets -nets DB
   create_ground_nets -nets SB
   create_power_nets -nets VDD!
   create_ground_nets -nets VSS!
   create_power_domain -name pd4
   update_power_domain -name pd4 -primary_power_net DC! -primary_ground_net SC!
   create_power_domain -name pd3
   update_power_domain -name pd3 -primary_power_net DA! -primary_ground_net SA!
   create_power_domain -name pd2
   update_power_domain -name pd2 -primary_power_net DB -primary_ground_net SB
   create_power_domain -name pd1 -default
   update_power_domain -name pd1 -primary_power_net VDD! -primary_ground_net VSS!
   set_instance I_A/I_2 -design BUFX2 -domain_mapping { {pd1 pd1} }
   set_instance I_B/I_0 -design BUFX2 -domain_mapping { {pd1 pd2} }
   set_instance I_A -design TESTCPF_SUB2 -domain_mapping { {pd1 pd3} }
   set_instance I_C -design BUFX2 -domain_mapping { {pd1 pd4} }
end_design
```

In the example, the power intent file is traversed until the leaf cell named "BUFX2" is encountered. The power intent for BUFX2 is then printed. BUFX2 includes primitive cells "mp1" and "mp0," These primitives do not include power information and power intent is not printed for them. As the design is traversed in the upward direction, a design called TEST_CPF_SUB2 is encountered and power intent for TEST_CPF_Sub2 is printed. The top level, TESTCPF_TOP is then reached and power intent for the top level is printed. In the example, exporting as printing is described. Exporting can also be storing the power intent in a different arrangement or in a different device, and exporting can also be transferring power intent to another process for use by the process.

In some examples, the power intent can be persistently stored within an information structure for the intermediate design level or for a portion of the intermediate deign level. After the circuit design hierarchy is traversed, the extracted power intent can be stored for each design level within itself. This can be implemented by using an extension (e.g., extensions such as those of encrypted properties and database groups) and/or mechanisms such as an Open Access API (e.g., oaAppDef and oaAppDef) to extend the schematic database schema to create a multi-tiered storage structure for the power intent. The multi-tiered storage can be in proprietary and hidden form as part of the original schematic databases for the top design level and sub-design levels. The extended schema can be mufti-tiered (e.g., to allow storage of more than one set of power intent in the same schematic) that could be referenced more than once depending upon the occurrences of paths to the schematic and/or depending upon the unique configurations and sub-configurations that reference the design.

Figure 10:
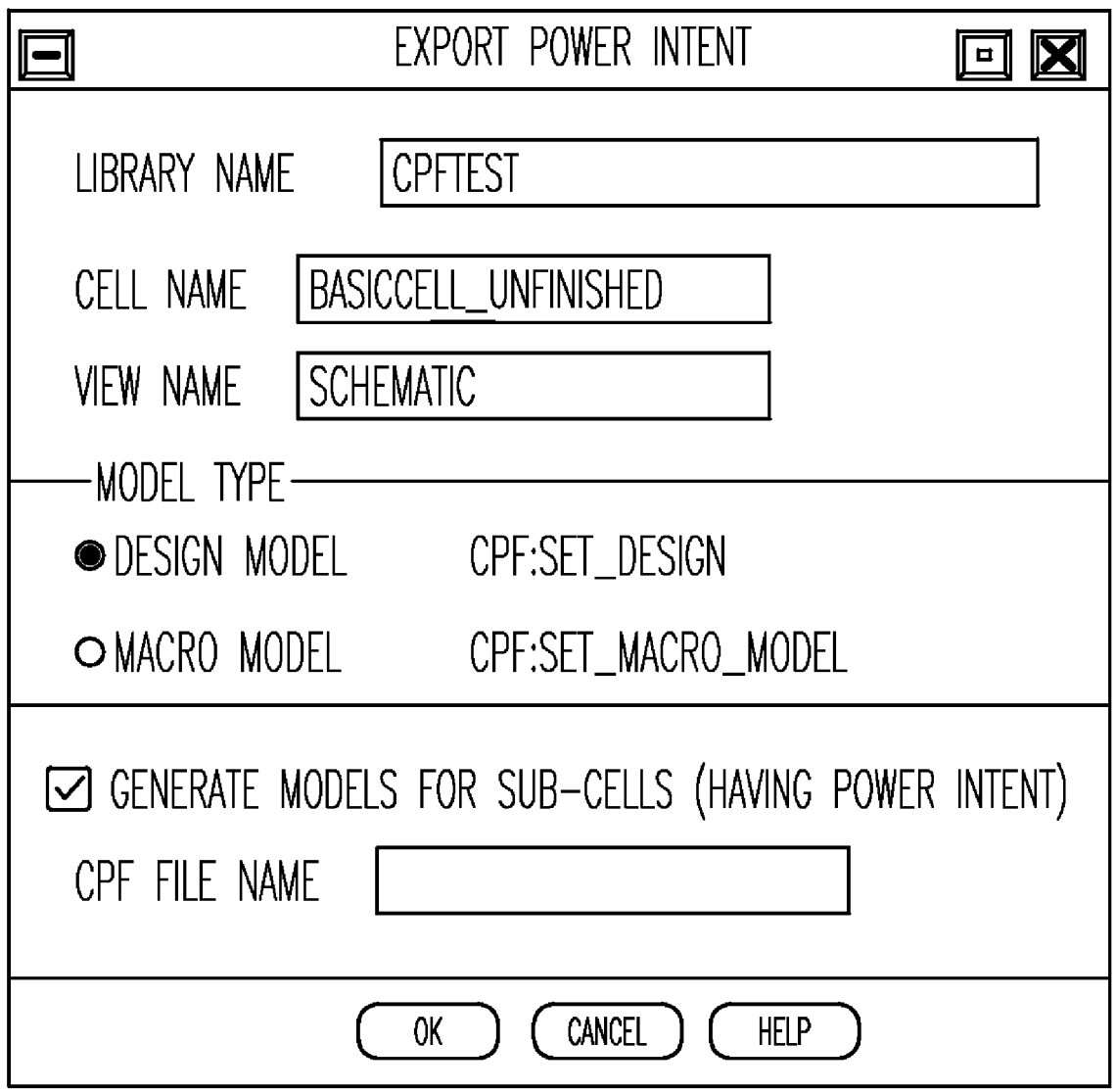

In some examples, produced power intent can be exported in response to a prompt received via a UI. Power intent can be exported for the top design level or any intermediate design level. FIG. 10 shows an example of an Export Power Intent Form for a UI. In some examples, the library name, the cell name, and the view names of the cell that is currently open by the user are automatically displayed in the Export Power intent Form. The cell name field can be any arbitrary selected design level with which the user desires to work. The power intent can be exported as a design model or a macro model. In the example shown in the FIG., the Design Model type is selected. To export the power intent as a macro model, the Macro Model option is selected.

Power intent can exported for hierarchy design levels encountered starting from the arbitrary selected design level down to the bottom design level. In the example, exporting the sub-design levels is optional and is enabled by selecting Generate models for sub-cells. The destination file path name for the exported power intent can be specified in the UI. In the example, the user can specify a file path name for a power intent specification in CPF. Thus, power intent can be exported for any level of the circuit design. If the circuit design includes an IP core or block, power intent can be created for the IP or any part of the IP.

In some examples, the storing and exporting the power intent is not related to power rule extraction and can happen any time the option is selected by the user. For instance, the user may quit a power intent application and restart it again just for the sake of exporting the power intent, without re-creating or extracting power intent.

As explained previously, power rules for the power intent can be added to the circuit by adding instantiating special cells in the circuit design. These special cells include power attributes and properties that are extracted when power intent is created. Some examples of special cells include an always-on cell, a power clamp cell, a power switch cell, a ground switch cell, a state retention cell, a power isolation cell, a level shifter cell, and a short device cell. This list of special cells is non-exhaustive and may include other types.

Figure 11:
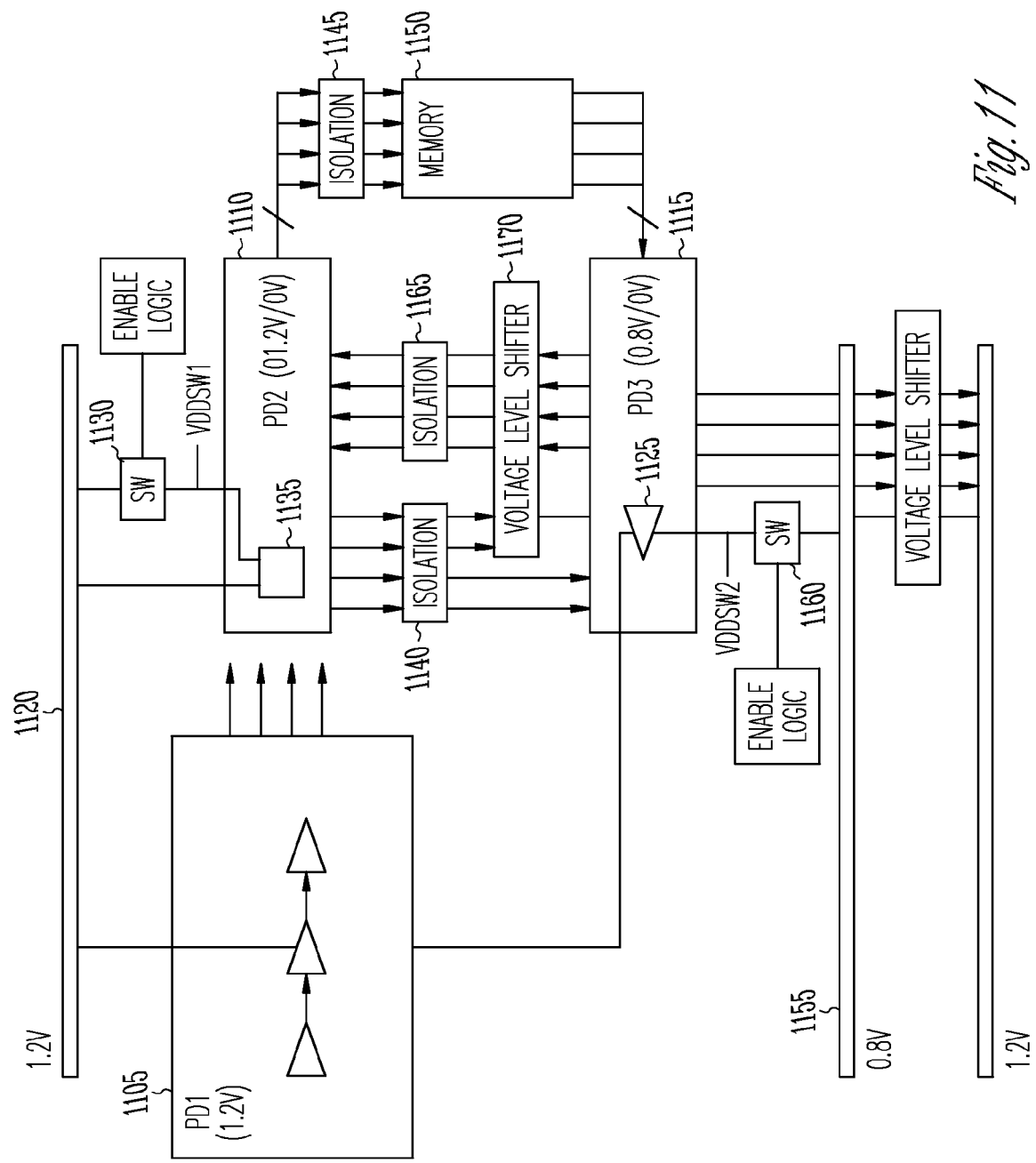
FIG. 11 shows a block diagram of portions of another example of a hierarchical circuit design.

FIG. 11 shows a block diagram of portions of an example of a hierarchical circuit design. Three power domains are shown, PD1 1105, PD2 1110, and PD3 1115. PD1 1105 includes instances of logic gates that use the same power supply during normal operation. PD1 1105 is connected to power rail 1120 and is always "on" and cannot be turned off.

An always-on cell instance 1125 receives power from two different supply domains, PD3 and PD1, also called primary and secondary power domains, respectively, to the always on cell instance 1125. As long as its secondary domain is on, the cell is always on.

A power clamp cell is a special cell diode that clamps a signal to a particular voltage. The power clamp cell includes a data pin, a single power pin, and a single ground pin. Even though the always-on instances and power clamps instances are not explicitly associated with a power rule, they should be included in the power intent specification to allow the formal verification or static checking tools to catch any error conditions (e.g., an always on cell instance when both its primary and secondary power domains are switchable) and to allow proper low power simulation.

Power domain PD2 1110 can be powered on to 1.2 V or powered off at 0V depending upon a particular power mode being used. Thus, PD2 1110 is connected to power rail 1120 using a power switch cell 1130, or head switch cell. This makes PD2 1110 connected to power rail 1120 by a switchable power net. Power switch cells were briefly described previously. The power switch cell 1130 assigns a shutoff condition to a switchable power domain (e.g., PD2 1110). The shutoff condition can include a logical expression derived from a circuit design signal, a terminal, or both a circuit design signal and a terminal. The shutoff condition prevents propagation of a signal from a primary power net (e.g., power rail 1120) to the internal switchable power net. A ground switch cell, or foot switch cell, is similar except that a switchable ground net is created instead of a switchable power net.

Power domain PD2 1110 also includes a state retention cell 1135 to maintain state information during any periods of time in which the power domain PD2 is powered down. The state retention cell 1135 is separately coupled to a secondary power domain through the power rail 1120 so that the cell retains state even though the primary power domain PD2 is generally shutoff from the power rail 1120. PD2 1110 is shown connected to isolation cells. Isolation cells ensure that inadvertent and unintended data is not propagated to other circuit blocks when the power domain is shutoff. The Figure shows isolation cells 1140 connect PD2 1110 to PD3 1115. Isolation cells 1145 connect PD2 1110 to memory 1150.

PD3 1115 is shown connected to 0.8V power rail 1155 by power switch 1160. PD3 1115 can be powered on to 0.8V or off to 0V depending on the power mode used. PD3 1115 is connected to isolation cells 1165 to ensure that inadvertent and unintended data is not propagated to other circuit blocks when PD3 1115 is shutoff. Level shifter cells are connected to circuit blocks that operate at different voltage levels. In FIG. 11, level shifter cells 1170 are shown connected between PD2 1110, which operates at 1.2V, and PD3 1115, which operates at 0.8V.

Figure 12:
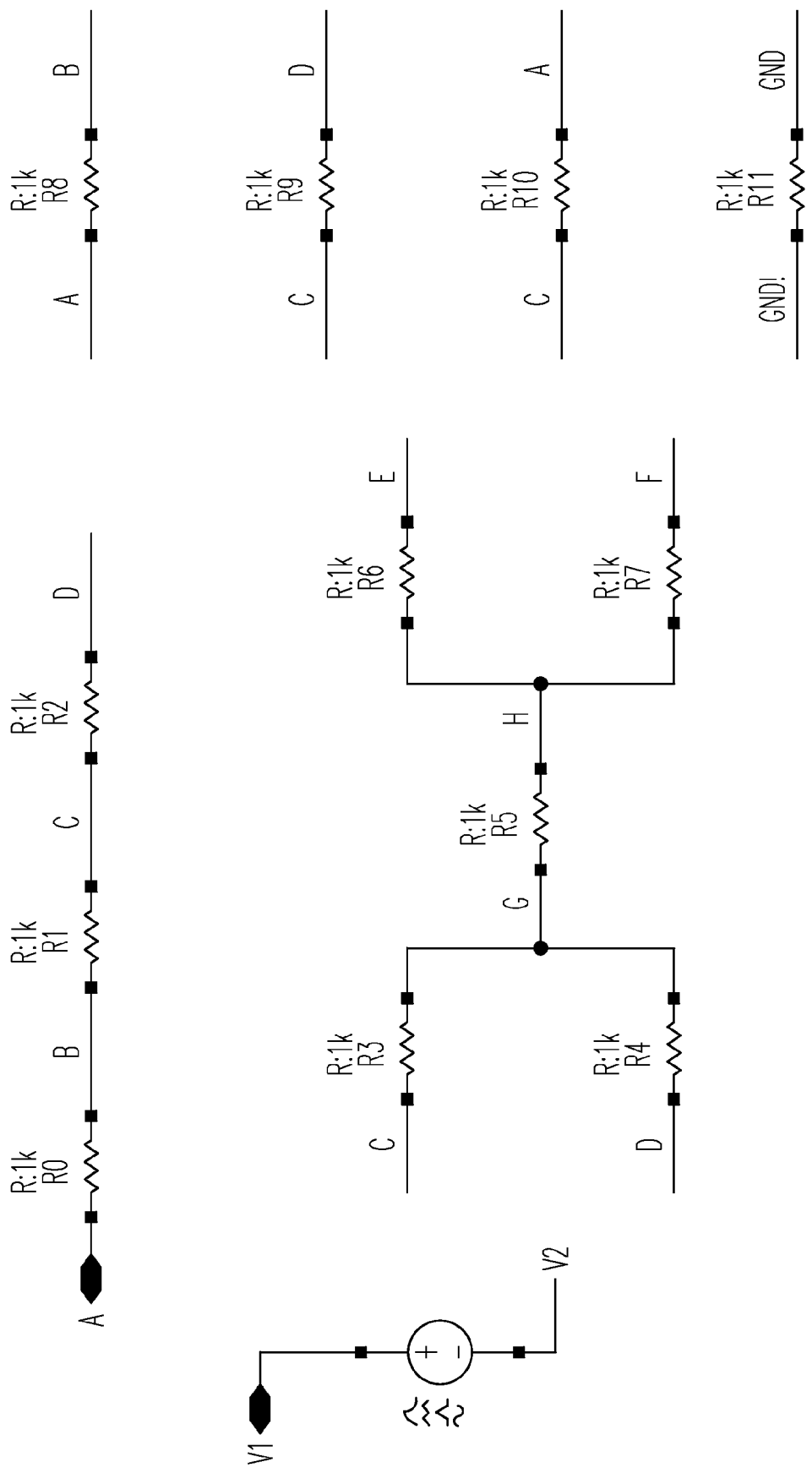
FIG. 12 is a schematic that shows an example of instantiating lower level blocks connected to power and ground pins through a series of short devices.

A short or shorting device connects or "shorts" two nets in a circuit design. FIG. 12 is a schematic that shows an example of instantiating short devices. The nets can be power nets, ground nets, or non-supply data nets. In some examples, a short device or short cell includes a resistor cell. The resistor may have a value of zero ohms to designate the resistor as a short device.

A given library cell can be registered as a short device using the API:

cpfRegisterShortDevice(libraryName cellName
   viewName)

where libraryName specifies the name of the library containing short device cell, the cellName is the name of the short device cell, and the viewName is a specific abstraction of the short device cell.

In some examples, a check for zero value is an optional election for a user. The user could set a minimum threshold instead of an exact match of zero ohms for a device to be considered a short device. In certain examples, the check for a resistance (e.g., zero) value could be turned off by the user. In certain examples, the short device cells could be any other library cell and the user indicates a resistance parameter to be looked up as part of a resistance value check. In certain examples, if one or more short devices connect power nets, all or some of which may have terminals, only one of the nets having a terminal would be used to produce a power domain. In certain examples, if one or more short devices are used to connect non-supply nets, all or some of which have a terminal, feedthrough port definitions (e.g., set_wire_feedthrough_ ports in CPF) would be extracted for all pairs of terminals in the power intent specification.

Figure 13:
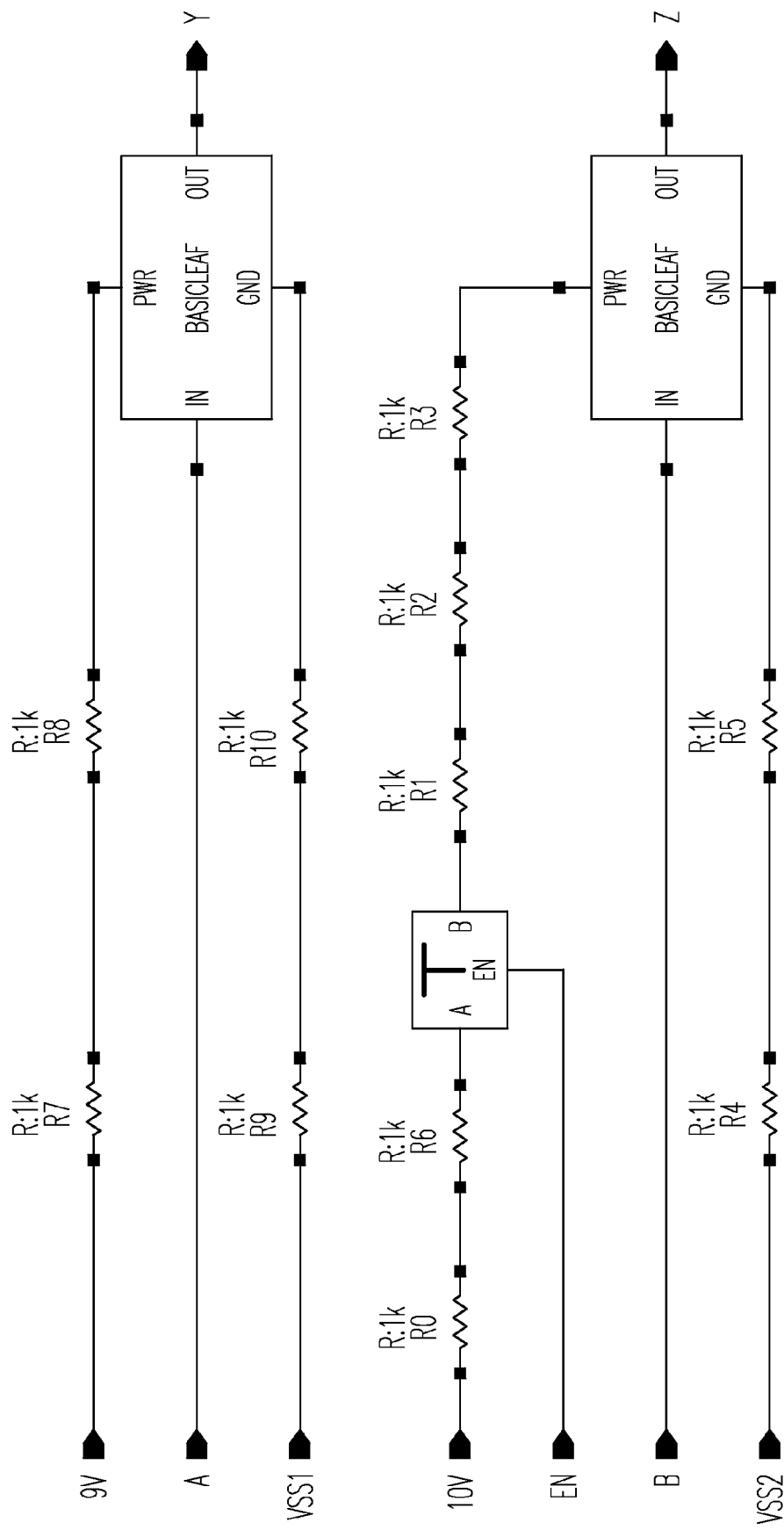
FIG. 13 is a schematic that shows another example of instantiating short devices.

In some examples, a power net at a higher level connects to a power terminal of a lower design level or through a network of short devices. FIG. 13 is a schematic that shows another example of instantiating short devices. The lower level cells are connected to higher level power nets through short devices. The lower level cells produce domain mappings, and the lower level domain mappings are similar to the domain mappings that would be produced when the short devices are missing.

Figure 14:
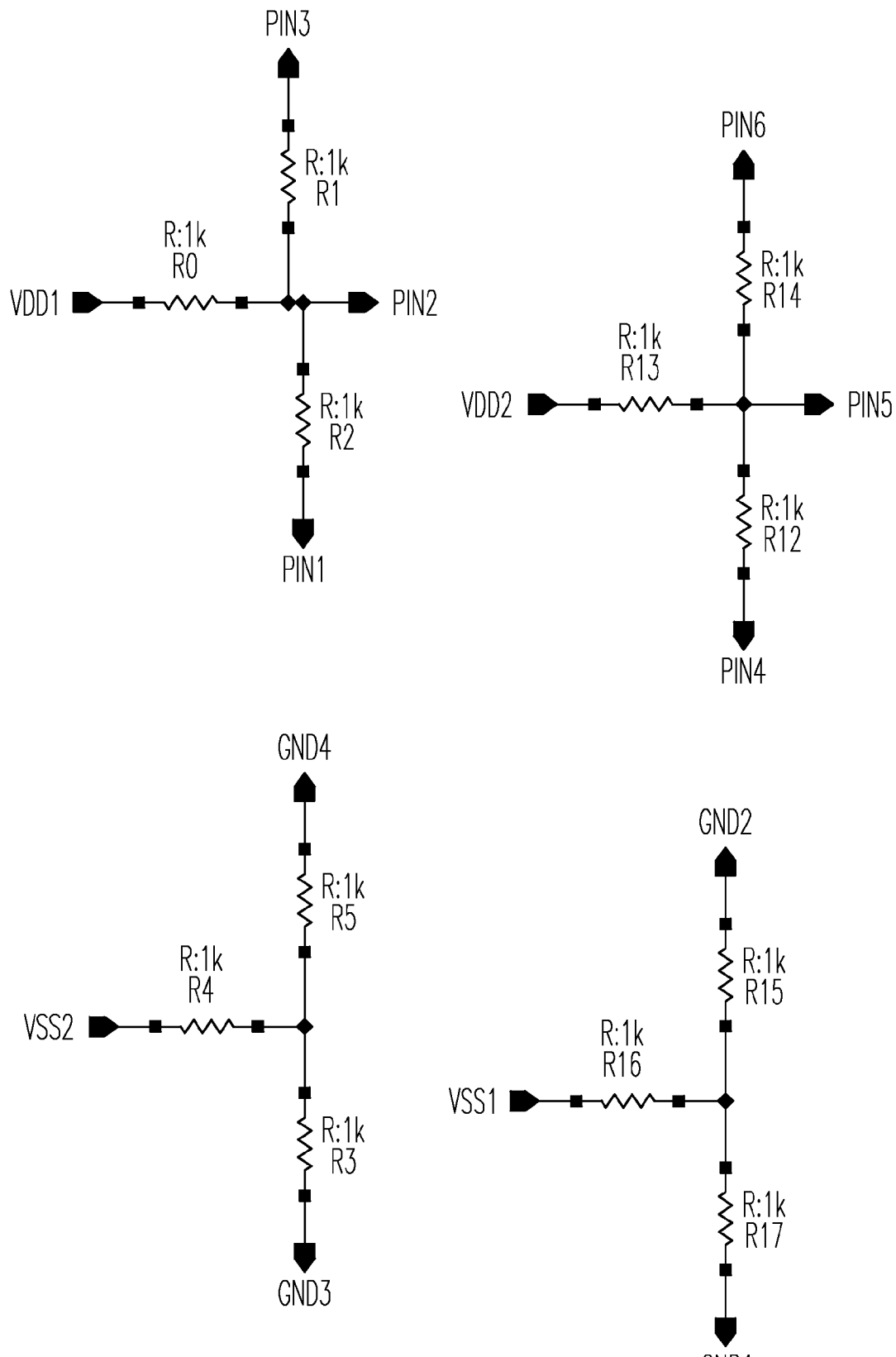
FIG. 14 shows an example of a schematic of a power pad cell.
Figure 15:
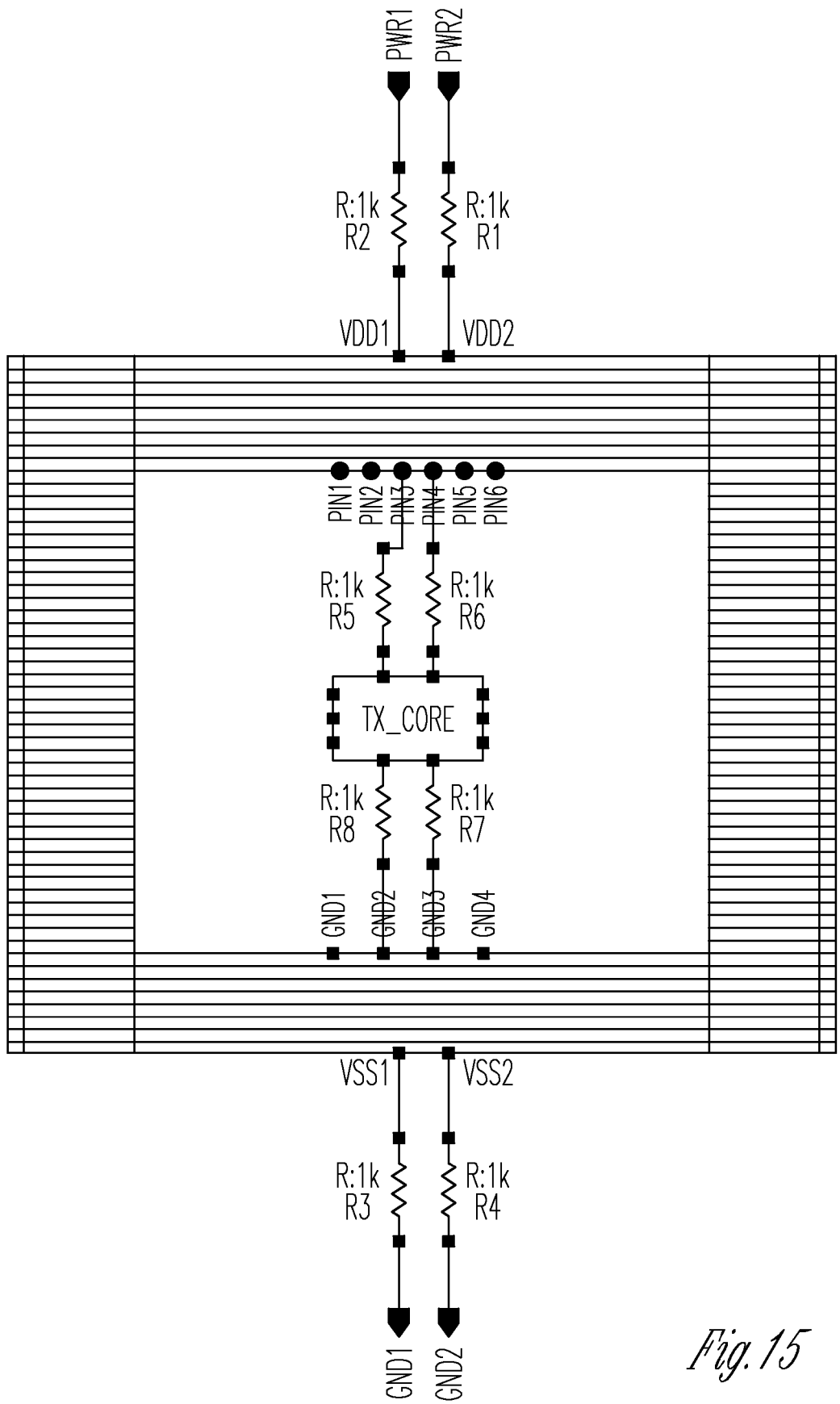
FIG. 15 shows an example of a schematic of lower level cells that connect to higher level power nets.

A power net at the higher level can also be connected to the power terminal of the lower level design though a POWER PAD cell instance. FIG. 14 shows an example of a schematic of a power pad cell. A power pad cell is similar to a short cell, but can have two or more terminals. The net of each input terminal of a power pad cell is of a power type or a ground type, and connects to one or more output pins through a network of one or more short devices. The input terminal and the output pins connected to it (possibly through a network of short devices) are called equivalent pins. A power pad cell can contain more than one set of equivalent pins. FIG. 15 shows an example of a schematic of lower level cell that connects to higher level power nets through a network of short devices and a pad cell instance (I1).

In some examples, instantiated special cells need to be registered before they can be identified and their associated power rules extracted. To register special cells, a library cell designated as a special cell is received into the application e.g., executing on the computing device 200 of FIG. 2) via the 215. Special low power properties are applied to the library cell via the UI identify the library cell as a special cell.

Figure 16:
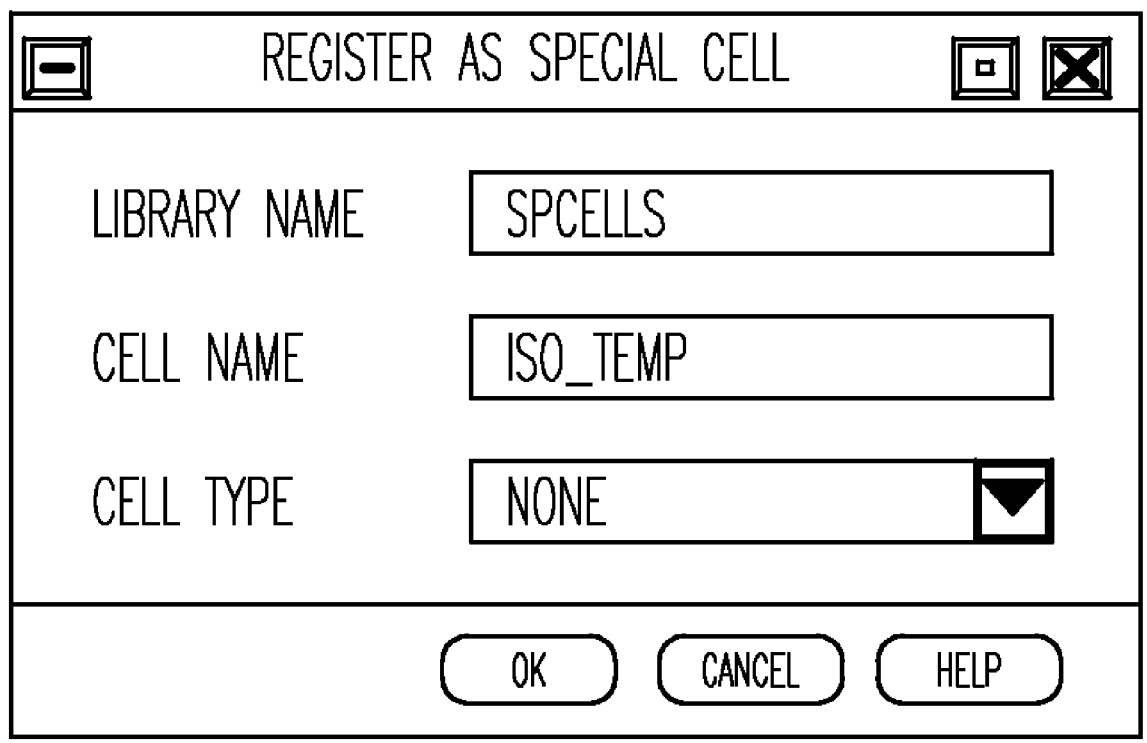
FIG. 16 shows an example of a Register Special Cell Form for a UI.
Figure 17:
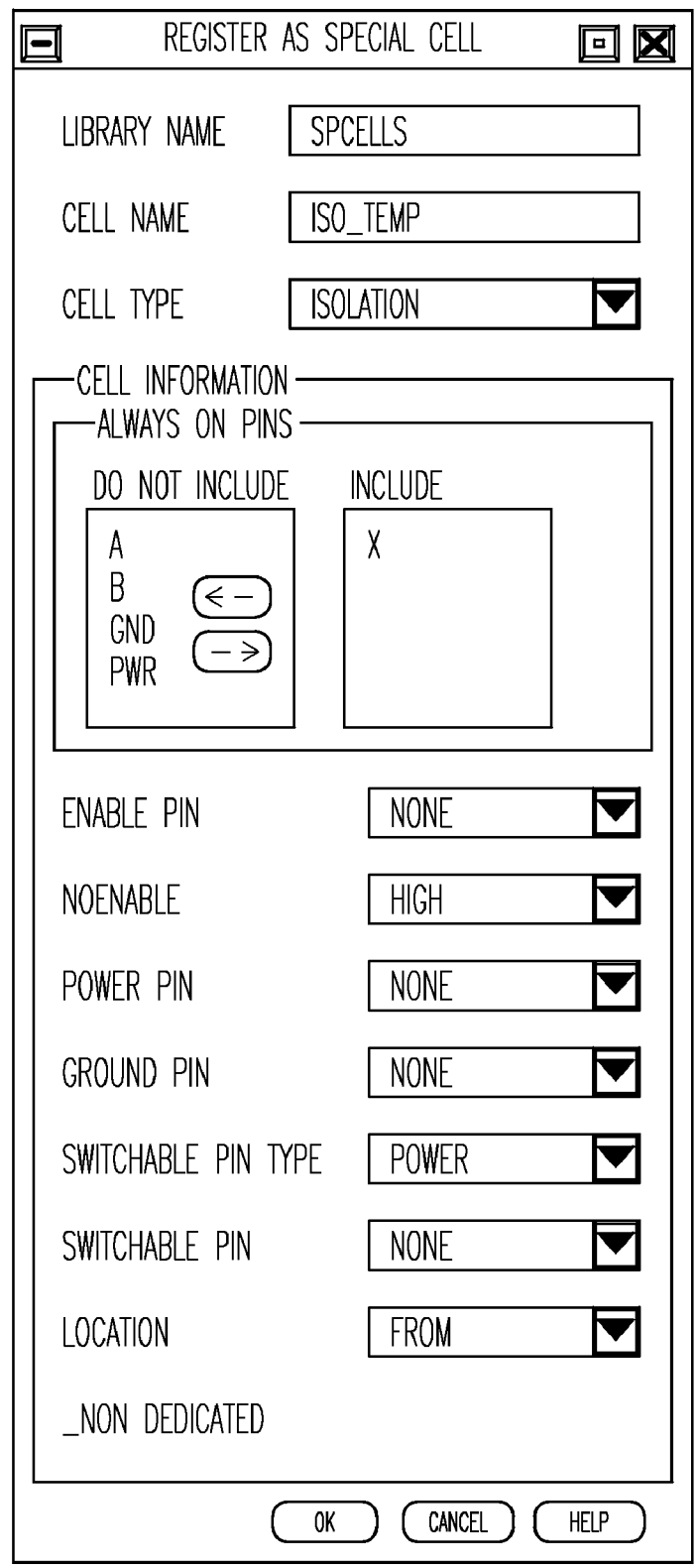
FIG. 17 shows example fields available for a power isolation cell.

FIG. 16 shows an example of a Register Special Cell Form for a UI. In some examples, the name of a special cell that is open in a schematic view is displayed in the form (the example in the FIG. is a power isolation cell named ISO_temp). Depending on the cell type selected, a set of fields can be displayed. FIG. 17 shows examples of fields available for a power isolation cell. Specifying the required values in the form can define a special cell construct that provides the properties or attributes used to generate power rules from the special cell.

To register an instance of a power pad cell, special properties are added to the pad cell instance (or on its instances), or by registering all sets of equivalent pins for a given library cell through an API such as:

```
cpfMapParam( "cpfWrapPadEqPins"
    '( ( "tx_wrap_pad_1" ("vdd1" "pin1" "pin2" "pin3")
 ("vdd2" "pin4" "pin5" "pin6")
        ( "tx_wrap_pad_2" ("vddx" "pinA" "pinB" "pinC")
 ("vddy" "pinD" "pinE" "pinF" "pinG")
        )
    )
```

This declares a mapping by the name of "cpfWrapPad-EqPins". The second argument is a list of list. Each element of that list is another sub-list. The first element of each sub-list is the cellName for a wrapper-pad cell and the rest of arguments of the sub-list are list of equivalent pins in the wrapper-pad master.

Special constructs can be exported as power intent. In some examples, one or more special cell constructs can be exported as a power technology file having an industry standard power technology file format, such as CPF, UPF, or liberty (.lib) file. The exported constructs can then be imported to provide power rules to the same or different circuit design. In some examples, a special cell construct is received via the UI as a power technology file having an industry standard power technology file format, and a set of one or more library cells is received via the UI and categorized as special cells.

In some examples, power intent can be created for a special cell by manual entry via the UI (e.g., by using the "define_*_cell" commands in CPF). Special cell properties are created as Component Description Format (CDF) parameters, within a separate file called the "property bag" to tag the library cell as a special cell. The resulting special cell power intent may only contain constructs or definitions of special cells. In certain examples, the power intent is created using an API and can be stored in an extended data base for a schematic.

According to some examples, it may be desirable to leave certain features of the circuit design undefined or easily changed during the schematic entry phase. This may be true for an analog circuit where values of behavioral parameters of the analog circuit are filled in later. In certain examples, these behavioral values can be related to power design. Thus, it can be useful to define a place holder design element cell. A design element cell can be placed in the schematic during schematic entry. When the power intent is produced for the circuit design, any instances of design element cells are identified (e.g., by a prefix) in the design. When identified, a design element information structure is created for a design element cell within the hierarchical power information structure. The design element information structure created may include a flag identifiable via a UI and one or more constructs to receive one or more circuit design values via the UI and to associate the design values with the design element in the circuit design. The flag (e.g., a searchable character string) allows the user to easily locate the design element information structure and manually enter or change the circuit design values.

A Low Power technology file (CPF/UPF technology file) can then be imported into a design. The result is a set of library cells that are received and automatically tagged as special cells. Thus, the user is not forced to do the special cell registration for each desired cell manually prior to enable the identification of special instances in the circuit design during automatic extraction.

The power rules are extracted from the special cells when power intent is created, such as by the method 300 described previously. An API can be used to register a prefix for rule created by special cells. In some examples, an API registers an identifying prefix to at least one of an isolation rule name, a power switch rule name, a ground switch rule name, a level shifter rule name, a power clamp rule name, and an always on rule name.

An example for a power switch cell was described previously. When generating power rules, power switch cells are identified and the associated internal switchable power nets are identified using the instances of the cell. A base power domain can be identified for each primary power net connectable to an identified internal switchable power net. Switchable power domains are then produced using the internal switchable power nets and base domains.

For short devices, any instances of special cells connected by a short device to one or more of supply nets, control/enable signals, and design components are identified when generating power rules. In some examples, this is done by an API. As shown above in FIG. 12, a short device cell instance includes a two-terminal cell instance representative of an electrical short between two nets connected to the two terminals. Power nets are identified by associating a primary power net with one or more equivalent power nets for each identified short device. Stated another way, the equivalent nets are aliases of the primary power nets because the short device connects the nets together. When power rules are generated, a power domain is produced using an identified primary power net and any equivalent nets of the identified primary power net.

In some examples, associating a primary power net with one or more equivalent power nets can include generating a primary net table and an equivalent net table. An entry of the primary net table includes a primary net name and any equivalent net names for the primary net name. A primary net can be a power net or a ground net. An entry of the equivalent net table includes an equivalent net name and any primary net names for the equivalent net name. When power rules are generated, a power domain can be produced by assigning the primary net names and any equivalent net names from the primary net table and equivalent net table to the power domain. FIG. 18 shows an example of extracted power domains for the short device example of FIG. 12.

In some examples, a set of low power feed-through port constructs (such as set_wire_feedthrough_ports in CPF) are automatically produced and added to the hierarchical power information structure for an intermediate level design by determining the design terminals that are associated with a common non-supply net (i.e. a net that is neither a power net nor a ground net). In certain examples, a set of low power feed-through port constructs are automatically produced and added to the hierarchical power information structure for an intermediate level design by determining the set of terminals that are connected to each other through one or more short devices.

In some examples, a set of floating ports low power constructs (such as set_floating_ports in CPF) are automatically produced and added to the hierarchical power information structure for an intermediate level design by determining the design terminals that are not connected to any logical inside the design.

When the power intent is produced, edits to the resulting hierarchical power information structure can be received via a UI. In some examples, the power rules can be manually entered or manually edited by a user via the UI. In some examples, a nominal operating condition for a power domain can be added to the hierarchical power information structure via the UI. A nominal operating condition is a typical operating condition under which the design or blocks perform and is determined by the voltages of all power supplies applied to a power domain. A nominal operating condition can include one or more of a power voltage, a ground voltage, and a body bias voltage for any PMOS and NMOS transistors for the power domain. FIG. 19 shows a Nominal Condition form for a UI.

In some examples, a power mode for set of one or more power domains can be added to the hierarchical power information structure via the UI. A power mode specifies a static state of a design in which the constituent power domains operate at a specific nominal condition. FIG. 20 shows a Create Power Mode form for a UI. A name for the power mode is specified in the Name field. A power domain is selected from the Power Domain list on the left. Multiple power domains may be selected. A nominal condition is selected from the Nominal Conditions list. This is the nominal condition at which the selected power domains operate in the power mode. The power domains and nominal conditions can be added to Domain Conditions list by clicking the right arrow button.

The nominal operating conditions and the power mode can be stored with the power intent within an information structure associated with a schematic of the intermediate level design. Other low power constructs in addition to nominal operating conditions and power modes can also be added to the produced hierarchical power information structure via the UI. Some examples of these low power constructs include, among other things, power mode control groups, hierarchy separator characters, timing units, voltage units, and power units.

Figure 21:
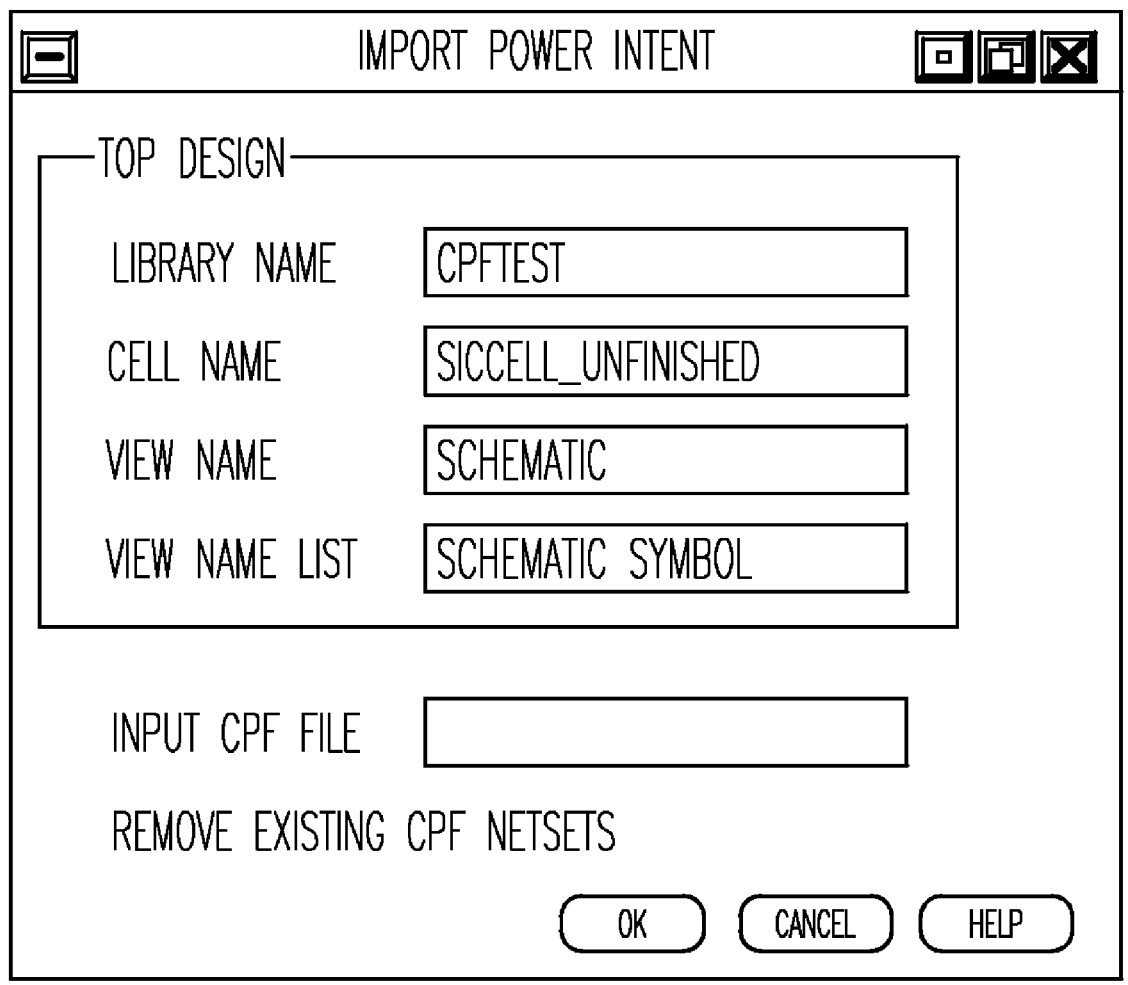

According to some examples, exported power intent can be imported into a circuit design. A file (e.g., CPF or UPF file) containing power intent can be imported and used as the power intent for a circuit design on which the user is working. FIG. 21 shows an example of an Import Power Intent form for a UI. The library, cell, and view names of the desired cell can be specified, or the user can browse for the file. The import process may then read in the power intent from the file and update the design with the power rules in the file. The signal type of power nets and ground nets may be set according to the power intent. Global constructs may be read in to define power intent of the circuit design (e.g., global special cells or global power nets and global ground nets may be created. Thus, power intent for an IP core or block can be imported into a design.

The systems and methods described herein have so far dealt with creating power intent hierarchically and creating a hierarchical information structure containing power intent. Another way to extract power intent from a design is to extract power intent no that the power domains, special cell definitions or constructs, and power rules for the entire design are all created only for the top design level of the circuit design. This can be viewed as a substantially flat information structure. The produced power intent is formatted to reference the design objects of the circuit design (e.g., nets, terminals, instances, instance-pins, etc.) for the entire design, by their fully qualified hierarchical path.

In some examples, producing the power intent for a circuit design includes tracing the supply nets at the top level throughout the design hierarchy, determining the instances connected to these supply nets at all levels of the hierarchy, determining the boundary ports of the supply nets based on the connectivity of such nets throughout the design hierarchy, determining the special cell instances throughout the design, and generating power rules from special cell constructs of the special cell instances. The supply net tracing may be done by following the path of a supply net from top level to the bottom level or by tracing the path of individual power and ground nets from lower design levels to the top design level.

Figure 22:
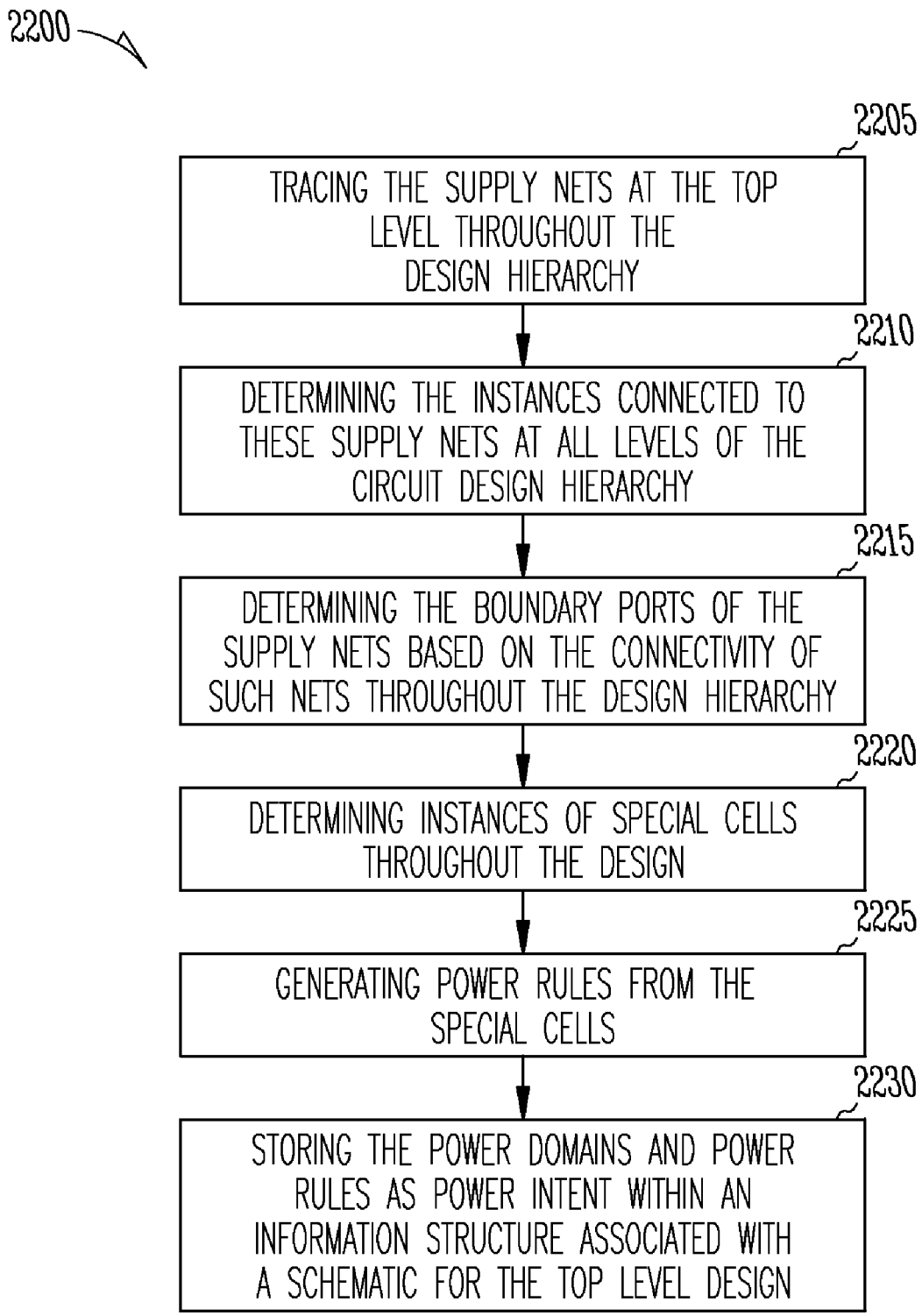
FIG. 22 shows a flow diagram of an example of a method for producing a hierarchical power information structure for a top design level of a circuit design.

FIG. 22 shows a flow diagram of an example of a method 2200 for producing a hierarchical power information structure for a top design level of a circuit design. At block 2205, the supply nets (power nets and ground nets) are traced at the top level throughout the design hierarchy. In some examples, tracing the supply nets at the top level throughout the design hierarchy includes traversing the entire circuit design hierarchy starting from the top level to the bottom level. At any intermediate design level encountered during the traversal, the supply nets are identified, such as by using the methods explained previously for power and ground net identification. For each identified supply net, the connectivity of the net is traced from the intermediate design level to the highest design level where the supply net originates or terminates. Some of the supply nets may start (or terminate) at the top level and some supply nets may start (or terminate) only from an intermediate design level. The identified supply nets can be used to identify unique or root power nets and root ground nets. In certain examples, only one unique occurrence of a highest design level supply net is retained that is driving one or more supply nets in the lower design levels.

It is possible that multiple lower level supply nets will be traced to a single net at a higher design level. A global supply net of a lower design level or an inherited supply net at a lower design level that remains unresolved until the highest level is assumed to map to a supply net that is always originating from the top level and has the same name as the name of the lower level supply net. An inherited supply net that is resolved during the tracing may map to a supply net that originates from any higher level including the top level. In some examples, a net association table is created that maintains an entry for a higher level supply net (e.g., a Net-Info Table) and also stores other information associated with such a higher level supply net, including its type (power or ground). If a local supply net at a lower design level is not associated with a terminal, such a net is restricted at the lower level and its corresponding higher level supply net is the same lower level net. This may be the case when the lower level net is an internal switchable net which is not associated with a terminal.

Also at the intermediate design level, after a higher level net is identified for a lower level power net, its entry in the Net-Info Table is referenced. If no entry for the corresponding higher level net is found, it is created in the Net-Info Table.

At block 2210, the instances connected to these supply nets are determined at all levels of the circuit design hierarchy. Each instance connected to a lower level power net can be associated with the higher level net entry under the category of domain-instances or power-domain-instances in the Net-Info Table. Terminals associated with each lower level power net are determined on the basis of their terminal supply sensitivity attributes or on the basis of their connections to instances that are directly connected to the lower level power net.

At block 2215, the boundary ports of the supply nets are determined based on the connectivity of such nets throughout the circuit design hierarchy. Boundary ports can be assigned to power domains. For each terminal associated with a power net, the connectivity of the power net is traced to a higher level design net and, if the traced higher level net also has a terminal, the higher level terminal is associated as a boundary port for the higher level power net entry that corresponds to the lower level power net under the category of boundary-ports in the Net-Info Table.

Still working at the intermediate design level, if a lower level power net is identified as an internal switchable power net using the methods explained previously, the lower level power net is marked as a switchable power net in the Net-Info Table. Also, the higher level net corresponding to the primary power net connected to the switch cell instance at the lower level can be determined. The lower level net can then be associated with the higher level net in the Net-Info Table. For example, the higher level net may have an entry of category "switchable net" in the Net-Info Table. A base power domain can be generated for each identified root power net. A root ground net is assigned to the base power domain. The lower level net may be associated with the higher level net in the Net-Info Table as a base power net under the category of "base-domain-nets."

Similarly, the higher level net (or a terminal of the higher level net) corresponding to the enable net connected to the switch cell instance at the lower level can be determined and associated in the Net-Info Table. For example, the higher level net may have an entry in the Net-Info Table of category "enable expression" with the higher level net entry corresponding to the lower level switchable net. The enable expression can correspond to a shut off condition for the internal switchable power net. Thus, the enable expression can include a logical expression, derived from one or more of circuit design signal originating at the top level and top level terminals, to prevent propagation of a signal from a primary power net to the internal switchable power net.

At block 2220, instances of special cell are determined throughout the design. Special cell instances can identified in the intermediate design level using the methods explained previously for special cell identification. A special cell entry can be created (if it does not already exist) for the special cell corresponding to special cell instance in cell association table (e.g., a Cell-Info table). For any instance of a special cell identified at the intermediate design level, a special cell definition or construct is created by querying the special cell attributes. The special cell connections to the intermediate level power nets are traced to the higher level power nets.

At block 2225, power rules fare generated from special cell constructs of the special cell instances. Using the special cell instance attributes and the traced higher level nets, a power rule entry is created in a power rules association table (e.g., a Power-Rule Table).

If an intermediate design level encountered in the traversal already has contents in its hierarchical power information structure populated, it may indicate that an IP block is being integrated in the design and the power intent has previously been extracted by a user. In some examples, identifying cell instances that already have power intent includes determining one or more of i) that the cell instance includes a global net as a primary power net, ii) determining that the cell instance includes a primary power net connected to a terminal and the design level higher than the cell instance resolves a connection to the primary power net at the instance level, and iii) the instance power domain has an unresolved inherited power net as a primary power net and the instance includes a property whose value is same as a net in the higher level that overrides the inherited net inside the instance.

In this case the power domains of the IP block should be mapped to the power domains of the top level design. To accomplish the mapping, each power domain hierarchical power information structure of the intermediate design level is enumerated. For each power domain in the hierarchical power information structure of the intermediate design level, the power net of the domain is identified and the connectivity of the domain is traced to a higher level design net available at the highest design level from which the net is originating (or terminating).

An association is created in another domain association table (e.g., called a Domain-Mapping Table) utilizing the hierarchical path leading to the current intermediate design level, the power domain in the intermediate design level and the higher level design net driving the intermediate level power domain. The Domain-Mapping Table stores the association between a hierarchical design instance, which can be identified using its hierarchical path, and all the higher level power nets that provide power to the available power domains inside the design level of the instance.

When the entire circuit design hierarchy is traversed, power intent is created inside the hierarchical power information structure for the top level design. The power intent can be created using the information collected in the Net-Info table, Cell-Info Table, Power-Rule Table and the Domain-Mapping Table. The entries in the Net-Info table are enumerated to generate power net table entries in the hierarchical power information structure of the top level design. In some examples, a base power domain is created corresponding to each non-switchable power net entry in the table. In some examples, an internal switchable power domain is created corresponding to each switchable power net entry in the Net-Info Table. The base domains may be created first so that these can be appropriately referenced when the internal switchable domains are created.

The power net for the power domain is the power net for a given Net-Info Table entry. The ground net for the power domain is determined on the bases of whether the net is a top level net or net lower down in the hierarchy. For a top level power net, a list of ground nets is generated by enumerating top level ground nets from the Net-Info Table. For an intermediate level power net that is not atop level power net, a list of ground nets is generated by enumerating nets of Net-Info Table and selecting the nets that are global ground nets and ground nets at the level of the power net. If the list of ground nets generated for a power net contains only one ground net the same ground net may be automatically associated with the power domain.

If the list contains multiple ground nets, associating power nets and ground nets may include specifying power net and ground net pairs via an API. For instance, power net and ground net pairs may be registered by

--- cpfRegPowerGroundNetPairs( '( ("VDD!" "GND!") ("VDDA" VSSA") ("PWR" "GND") ) ).

---

Using the above API, a specified ground net can be associated to a power net using the registered power and ground net names when producing or extracting power domains from the circuit design. For example, if a power net for the power domain has a name VDDA, then a top level ground net with the name VSSA would be associated with the power domain. If the power net identified is "I0/I1/VDDA", then the ground net in the design level determined by descending into I0/I1 and having name VSSA would be associated with the power domain.

The boundary ports can be associated with a power domain by enumerating the terminal names recorded in the Net-Info table entry for the power domain's power net, under the category of boundary-ports. The instances of a power domain are associated by enumerating the instance names recorded in the Net-Info Table entry for the power domain's power net, under the category of instances.

Base power nets stored in the Net-Info Table under the category "base-domains" can be used to assign base domains to internal switchable power domains. A base power net is assigned to an internal switchable power domain according to the base domain entry corresponding to entry for the switchable power net of the power domain. Likewise, the shutoff condition for the internal switchable power domain can be assigned using entries stored in the Net-Info Table under the category of "enable expressions." An enable expression for a shut off condition is assigned according to the enable expression entry corresponding to the switchable power net of the power domain.

The special cell definitions are created in the hierarchical power information of the top level design by enumerating the entries of the Cell-Info Table. Each entry of the Cell-Info Table stores information relevant to one special cell definition that was collected during the hierarchy traversal, by querying the attributes of a special cell instance.

The power rules are created in the hierarchical power information of the top level design by enumerating the entries of the Power-Rule Table. Each entry of the Power-Rule Table stores information relevant to one power rule that was collected during the hierarchy traversal, by querying the attributes of a special cell instance and the its connections to power net. The references to power nets within each entry of the Power-Rule Table help in the determining of top level power domains to be actually used in the creation of power rules.

The per-instance domain mappings are produced in the hierarchical power information of the top level design by enumerating the entries of the Domain-Mapping Table. Each entry of the Domain-Mapping Table stores the association between a hierarchical design instance, which is identified by its hierarchical path, and all the higher level power nets that provide power to the available power domains inside the design level of the instance. For each table entry, a per-instance domain mapping is created for the hierarchical instance path. The lower level power domains are already known from the table entry, and the higher level domains are determined by looking up the top level power domains for whose power nets match the power nets stored in the table entry.

The result of enumerating the several association tables is the creation of power intent inside the hierarchical power information structure for the top level design. At block 2230, the power domains and power rules are stored as power intent within an information structure associated with a schematic for the top level design As shown in the several examples herein, automatically producing a power intent specification from a finished circuit design at the time the design specification of the circuit design ensures that the specification is correct by construction and assists the designer by avoiding the need for manual creation of a power intent specification which is quite tedious and can be an error prone task. Having a correct power intent specification at this time step in the design also allows power intent to be incorporated into the FDA flow to verify the IC design and perform low power simulation of the design. In addition, once the power intent is set up for a design, the power intent can be easily updated and re-exported reducing cost and time in the design process.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method of producing a hierarchical power information structure for a circuit design, the method comprising:
   using a computing device to traverse a circuit design hierarchy, that includes multiple instances encoded and arranged hierarchically in computer readable storage device, from a top design level to a bottom design level to identify at least one intermediate design level in the circuit design hierarchy;
   identifying one or more power nets and one or more ground nets in an intermediate design level;
   associating, by the computing device, identified power nets with ground nets to produce one or more power domains;
   identifying an instance of one or more special cells in the intermediate design level that are associated with a power related property and creating constructs for the special cells in the hierarchical power information structure;
   generating, by the computing device, power rules for the intermediate level design using the special cell constructs;
   traversing the circuit design hierarchy from the bottom design level to the top design level to map higher design level power domains to lower design level power domains; and
   storing the power domains and power rules as power intent as at least a portion of a data structure associated with a schematic for the intermediate level design.

2. The method of claim 1, further comprising producing power intent for the top design level, wherein power intent in the hierarchical power information structure is arranged hierarchically by storing power intent for each design level within an information structure associated with a schematic for that design level.

3. The method of claim 1, further comprising at least one of:
   receiving a special cell construct as a power technology file; and
   receiving a set of one or more library cells as special cells via a user interface (UI).

4. The method of claim 1, wherein the special cells include one or more of:
   a power isolation cell;
   a power switch cell;
   a ground switch cell;
   a level shifter cell;
   a power clamp cell;
   a state retention cell; and
   an always-on cell.

5. The method of claim 1, further comprising:
   receiving at least one nominal operating condition for a power domain via a UI, wherein a nominal operating condition includes one or more of a power voltage, a ground voltage, and a body bias voltage for PMOS and NMOS transistors for the power domain;
   receiving at least one power mode for a power domain via the UI, wherein a power mode specifies a static state of a design in which each power domain operates at a specific nominal condition; and
   storing the at least one nominal operating condition and at least one power mode with the power intent within the information structure associated with the schematic of the intermediate level design.

6. The method of claim 1, further comprising:
   receiving identification of a set of one or more net names to be treated as power net names via at least one of a UI or an application programming interface (API); and
   receiving identification of a set of one or more net names to be treated as ground net names via the at least one of the UI and API, and
   wherein producing a power domain includes associating a specific identified ground net with a specific identified power net for the power domain.

7. The method of claim 6, further comprising:
   receiving identification of a power net and a ground net of a default power domain via the at least one of the UI and API; and
   assigning a power net and ground net, included in the circuit design, that matches the identified power net and ground net to the default power domain.

8. The method of claim 6, further comprising:
   identifying at least one of an intermediate level design or a sub-design of a specific model type within the circuit design, wherein the at least one of the intermediate level design or the sub-design include a specified power net and a specified ground net; and
   assigning the at least one of the intermediate level design and the sub-design to a power domain having a matching power net and ground net.

9. The method of claim 6, further comprising assigning an instance associated with a specified name and path and having a specified power net and ground net to a power domain having a matching power net and ground net.

10. The method of claim 1, further comprising:
    identifying an instance of a design element cell in the circuit design;
    creating a design element information structure for the design element cell within the hierarchical power information structure, wherein the design element information structure includes:
       a flag identifiable via a UI;
       one or more constructs to receive one or more circuit design values via the UI and to associate the design values with the design element in the circuit design.

11. The method of claim 1, including:
    importing, via a UI, power intent information for an instance of at least one special cell; and
    incorporating the imported power intent information into the power intent for the intermediate design level.

12. The method of claim 1, including:
    identifying at least one of a cell instance or design level having pre-generated power intent information for at least one of a cell or design level encountered during the traversing, wherein the power intent is stored as a data structure in association with a schematic for the least one of the cell instance or design level; and
    incorporating the power intent into the power intent information for the intermediate level design.

13. The method of claim 12, wherein identifying power intent for a cell instance includes at least one of:
    identifying a cell instance that includes a global net as a primary power net; and
    identifying a cell instance that includes a primary power net connected to a terminal and the design level higher than the cell instance resolves a connection to the primary power net at the cell instance.

14. The method of claim 12, wherein identifying power intent for a cell instance includes identifying a cell instance that includes an instance power domain having an unresolved inherited power net as a primary power net and the cell instance includes a property whose value is the same as a net in the higher level that overrides an inherited net inside the cell instance.

15. The method of claim 1, wherein producing a hierarchical power information structure for a circuit design includes producing the hierarchical power information as part of schematic entry application.

16. The method of claim 15, wherein the power related properties are added to a design by instantiating the one or more special cells.

17. The method of claim 1, including assigning at least one of a cell instance or a design model instance to a power domain using an API, wherein the at least one of the cell instance or the design model instance includes a power net and a ground net that matches the power net and ground net of the power domain.

18. The method of claim 1, including assigning instances in the design of at least one of a cell type or a design model type to a power domain using at least one of a UI or an API, wherein the at least one of the cell type or the design model type includes a specified power net and specified ground net that matches a power net and ground net of the power domain.

19. The method of claim 1, including:
registering pairs of power net names and ground net names in a table using at least one of a UI or an API, and
associating a specified ground net to a specified power net using the registered pairs of power and ground net names when extracting power domains and default power domains from the circuit design.

20. The method of claim 1, including:
receiving an identifying prefix for a power domain name via a UI; and
prefixing created power domains in the design with the identifying prefix.

21. The method of claim 1, including:
receiving, via a UI, an identifying prefix for at least one of a power isolation rule name, a power switch rule name, a ground switch rule name, a power level shifter rule name, a power clamp rule name, and an always on rule name; and
prefixing a power rule generated in the design with the identifying prefix.

22. A non-transitory computer-readable medium including instructions that, when performed by a computing device, cause the computing device to perform acts comprising:
traversing a circuit design hierarchy that includes multiple instances encoded and arranged hierarchically in computer readable storage device from a top design level to a bottom design level to identify an intermediate design level in the circuit design hierarchy;
identifying one or more power nets and one or more ground nets in an intermediate design level;
associating identified power nets with ground nets to produce one or more power domains;
identifying an instance of one or more special cells in the intermediate design level that are associated with a power related property and creating constructs for the special cells in the hierarchical power information structure;
generating power rules for the intermediate level design using the special cell constructs;
mapping higher design level power domains to lower design level power domains within the intermediate design level; and
storing the power domains and power rules as power intent within an information structure associated with a schematic for the intermediate level design.

23. A method of producing a hierarchical power information structure for a circuit design, the method comprising:
using a computing device to traverse a circuit design hierarchy that includes multiple instances encoded and arranged hierarchically in computer readable storage device from a top design level to a bottom design level;
tracing supply nets at the top design level throughout the circuit design hierarchy, wherein the supply nets include power nets and ground nets;
determining connections between cell instances in the supply nets at design levels of the circuit hierarchy and determining, by the computing device, power domain instances using the connections;
determining boundary ports of the supply nets based on connectivity of supply nets in the circuit design hierarchy;
determining instances of one or more special cells in the circuit design hierarchy that are associated with a power related property and creating definitions for the special cells;
generating, by the computing device, power rules from the special cell definitions; and
storing the power domains and power rules as power intent as at least a portion of a data structure associated with a schematic for the top level design, wherein the power intent references a design object by a full hierarchical path for the design object.

24. The method of claim 23, further including storing associations of at least one of:
a supply net in a higher level design with a supply net in a lower level design;
a special cell with an intermediate design level;
a power rule with an intermediate design level; and
a power domain with a higher level power net, wherein the power domain is within a design level of a hierarchical design instance and the higher level power net provides power to the power domain, and
wherein power intent is created by enumerating stored associations of net information, special cell properties, power rules, and power domains.

25. A computing device to produce a hierarchical power information structure for a circuit design that includes multiple instances encoded and arranged hierarchically in computer readable memory, the computing device including an extraction module configured to:
traverse a circuit design hierarchy that includes multiple instances encoded and arranged hierarchically in computer readable storage device from a top design level to a bottom design level to identify at least one intermediate design level in the circuit design hierarchy;
identify one or more power nets and one or more ground nets in an intermediate design level;
associate identified power nets with ground nets to produce one or more power domains;
identify an instance of one or more special cells in the intermediate design level that are associated with a power related property and creating constructs for the special cells in the hierarchical power information structure;
generate power rules for the intermediate level design using the special cell constructs;
map higher design level power domains to lower design level power domains within the intermediate design level; and
store the power domains and power rules as power intent within an information structure associated with a schematic for the intermediate level design.

26. The computing device of claim 25, further comprising:
a user interface (UI); and
a memory integral to, or communicatively coupled to, the computing device and configured to store the circuit design; and
wherein the extraction module is configured to:
store power intent within an information structure for at least a portion of design levels of the circuit design; and
export the power intent in response to a prompt received via the UI.

27. The computing device of claim 26, wherein the extraction module is configured to export the power intent for at least one of:
the top design level;
any intermediate design level; and
a hierarchical design level that starts from any arbitrary selected design level down to the bottom design level,
as at least one of a design model and a macro model in response to a prompt received via the UI.

28. The computing device of claim 25, further comprising a UI configured to:
receive a special cell construct as a power technology file having an industry standard power technology file format; and
receive a set of one or more library cells via the UI and categorizing the library cells as special cells.

29. The computing device of claim 28, wherein the special cells include at least one of:
a power isolation cell;
a power switch cell;
a ground switch cell;
a level shifter cell;
a power clamp cell;
a state retention cell; and
an always-on cell, and
wherein the computing device includes an application programming interface (API) configured to identify the instance of the cell and query attributes of the cell instance to extract a power design rule from the cell instance.

30. The computing device of claim 25, further comprising an API configured to assign instances of at least one of a cell type or a design model type, included the circuit design, that has a specified power net and a specified ground net to a power domain having a matching power net and ground net.

31. The computing device of claim 25, further comprising an API configured to assign at least one of an instance of a cell or an instance of a design model, included in the circuit design, having a specified power net and ground net to a power domain having a matching power net and ground net.

32. The computing device of claim 25, further comprising an API configured to:
identify any instances of a short device in the circuit design, wherein a short device cell instance includes a two-terminal cell instance representative of an electrical short between two nets connected to the two terminals;
associate a primary power net with one or more equivalent power nets for each identified short device; and
identify one or more primary power nets for a power domain and any associated equivalent nets of the identified primary power nets.

33. The computing device of claim 25, further comprising:
an API configured to register pairs of power net names and ground net names, and
wherein the extraction module is configured to associate a specified ground net to a power net using the registered power and ground net names when extracting power domains and default power domains from the circuit design.

34. The computing device of claim 25, further comprising an API configured to register an identifying prefix for at least one of a power domain name, an isolation rule name, a power switch rule name, a ground switch rule name, a level shifter rule name, a power clamp rule name, and an always on rule name.

35. The computing device of claim 25, wherein the UI is configured to receive edits to the hierarchical power information structure.

36. A device comprising:
means for traversing a circuit design hierarchy, that includes multiple instances encoded and arranged hierarchically in computer readable storage device, from a top design level to a bottom design level to identify at least one intermediate design level in the circuit design hierarchy;
means for identifying one or more power nets and one or more ground nets in an intermediate design level;
means for associating identified power nets with ground nets to produce one or more power domains;
means for identifying an instance of one or more special cells in the intermediate design level that are associated with a power related property and creating constructs for the special cells in the hierarchical power information structure;
means for generating power rules for the intermediate level design using the special cell constructs;
means for traversing the circuit design hierarchy from the bottom design level to the top design level to map higher design level power domains to lower design level power domains; and
means for storing the power domains and power rules as power intent within an information structure associated with a schematic for the intermediate level design.

* * * * *